United States Patent
Edmonds

(10) Patent No.: US 10,701,894 B2
(45) Date of Patent: Jul. 7, 2020

(54) ANIMAL ENCLOSURE

(71) Applicant: Edmonds Outdoors, LLC, Brentwood, TN (US)

(72) Inventor: Addison Edmonds, Franklin, TN (US)

(73) Assignee: Edmonds Outdoors, LLC, Nashville, TN (US)

( * ) Notice: Subject to any disclaimer, the term of this patent is extended or adjusted under 35 U.S.C. 154(b) by 0 days.

(21) Appl. No.: 14/452,010

(22) Filed: Aug. 5, 2014

(65) Prior Publication Data
US 2015/0034018 A1    Feb. 5, 2015

Related U.S. Application Data

(60) Provisional application No. 61/862,393, filed on Aug. 5, 2013.

(51) Int. Cl.
*A01K 1/02* (2006.01)
(52) U.S. Cl.
CPC .................. *A01K 1/0245* (2013.01)
(58) Field of Classification Search
CPC .. A01K 1/0245; A01K 1/0254; A01K 1/0272; A01K 1/0035; A01K 1/033; A01K 1/034
USPC ................. 119/496, 497, 500, 453, 482, 499
See application file for complete search history.

(56) References Cited

U.S. PATENT DOCUMENTS

| | | | |
|---|---|---|---|
| 138,111 A | 4/1873 | Adriaans | |
| D138,111 S | 4/1873 | Adriaans | |
| 823,544 A | 6/1906 | Parker | |
| 1,020,349 A | 3/1912 | Havard | |
| 2,217,871 A | 12/1940 | Lundgreen | |
| 2,313,591 A | 3/1943 | Samuel | |
| 2,464,709 A | 3/1949 | Nello | |

(Continued)

FOREIGN PATENT DOCUMENTS

| CN | 12764148 Y | 3/2006 |
|---|---|---|
| CN | 102037899 A | 5/2011 |

(Continued)

OTHER PUBLICATIONS

PCT/US2014/049800, International Search Report, dated Nov. 21, 2014, 13 pages.

(Continued)

*Primary Examiner* — Peter M Poon
*Assistant Examiner* — Jeffrey R Larsen
(74) *Attorney, Agent, or Firm* — Waller Lansden Dortch & Davis, LLP; Matthew C. Cox

(57) ABSTRACT

An animal enclosure includes an inner wall defining an enclosure space for an animal and an outer wall at least partially surrounding the inner wall. A gap is defined between the inner and outer walls. The gap is filled with a gas such as air in some embodiments. In other embodiments, the gap is filled with a filler material such as foam or polymer material. The animal enclosure includes an upper housing member and a lower housing member in some embodiments. The upper and lower housing members may be secured together using one or more fasteners to form the animal enclosure. Each of the upper and lower housing members is rotational molded in some embodiments. Each of the upper and lower housing members includes an outer wall and an inner wall, each separated by a gap, in some embodiments.

1 Claim, 19 Drawing Sheets

(56) References Cited

U.S. PATENT DOCUMENTS

| | | |
|---|---|---|
| 2,544,505 A | 3/1949 | Semen |
| 2,790,414 A | 4/1957 | Rossow |
| 3,536,044 A | 10/1970 | Stephens |
| 3,724,025 A | 4/1973 | Hicks |
| 3,785,344 A | 1/1974 | Patterson |
| 4,016,833 A * | 4/1977 | Ray .................. A01K 1/03 119/498 |
| 4,090,472 A | 5/1978 | York |
| 4,339,147 A | 7/1982 | Kimzey |
| 4,525,952 A | 7/1985 | Cunningham et al. |
| 4,561,526 A | 12/1985 | Winter |
| 4,575,109 A | 3/1986 | Cowdery |
| 4,696,259 A * | 9/1987 | Fewox .................. A01K 1/034 119/452 |
| 4,852,520 A | 8/1989 | Goetz |
| 4,917,047 A | 4/1990 | Wazeter, III |
| D308,429 S | 6/1990 | VanSkiver |
| D308,588 S | 6/1990 | Goetz |
| D312,333 S | 11/1990 | Van Skiver |
| D314,251 S | 1/1991 | Van Skiver |
| 5,154,137 A | 10/1992 | Stanaland |
| 5,154,265 A | 10/1992 | Capistrant |
| 5,168,829 A * | 12/1992 | Dietrich .................. A01K 1/031 119/481 |
| D334,087 S | 3/1993 | Goetz |
| 5,220,882 A * | 6/1993 | Jenkins .................... A01K 1/03 119/420 |
| 5,253,612 A | 10/1993 | Goetz |
| D351,688 S | 10/1994 | Northrop |
| 5,357,900 A | 10/1994 | Ho |
| D352,573 S | 11/1994 | Sampson |
| 5,373,708 A | 12/1994 | Dumoulin, Jr. |
| 5,467,734 A | 11/1995 | Ho |
| 5,669,331 A | 9/1997 | Richmond |
| 5,701,843 A | 12/1997 | Lazides |
| 5,727,503 A * | 3/1998 | Whittaker ............ A01K 1/0245 119/500 |
| 5,911,763 A | 6/1999 | Quesada |
| 5,931,120 A | 8/1999 | Burns |
| 5,934,425 A | 8/1999 | Sadow |
| 6,021,740 A | 2/2000 | Martz |
| D426,680 S | 6/2000 | Morley |
| 6,095,088 A * | 8/2000 | Savicki ................ A01K 1/0114 119/166 |
| 6,223,691 B1 | 5/2001 | Beattie |
| 6,230,656 B1 | 5/2001 | Walach |
| D445,222 S | 7/2001 | Ross |
| 6,345,591 B1 | 2/2002 | Richmond |
| 6,427,631 B1 | 8/2002 | Ross |
| 6,446,577 B1 | 9/2002 | Salahor |
| D470,628 S | 2/2003 | Kinder et al. |
| D471,676 S | 3/2003 | Kinder et al. |
| 6,571,740 B1 * | 6/2003 | Kinder .................. A01K 1/0245 119/416 |
| 6,698,812 B1 | 3/2004 | Stubbs |
| 6,732,676 B1 | 5/2004 | Smith |
| 6,766,769 B1 | 7/2004 | Doyle |
| 6,840,193 B2 | 1/2005 | Kost |
| 7,025,394 B1 | 4/2006 | Hunt |
| 7,070,190 B2 | 4/2006 | Sadow |
| 7,036,458 B1 | 5/2006 | Stornant |
| 7,044,083 B2 | 5/2006 | Farmer et al. |
| 7,090,242 B1 | 8/2006 | Sheinall |
| D529,666 S | 10/2006 | Simpson |
| 7,152,554 B2 | 12/2006 | Crawford |
| D538,942 S | 3/2007 | Grunchy |
| D545,507 S | 6/2007 | Harper et al. |
| D546,005 S | 7/2007 | Harper et al. |
| D551,399 S | 9/2007 | Harper et al. |
| D555,292 S | 11/2007 | Harper et al. |
| 7,261,060 B1 | 12/2007 | Garofola |
| 7,322,315 B2 | 1/2008 | Brewer et al. |
| 7,334,802 B2 | 2/2008 | Kaplan |
| D566,907 S | 4/2008 | Barca |
| D571,053 S | 6/2008 | Donnelly |
| D571,054 S | 6/2008 | Donnelly |
| D574,559 S | 8/2008 | You et al. |
| D583,108 S | 12/2008 | Richardson |
| D584,458 S | 1/2009 | You |
| D611,201 S | 3/2010 | Jakubowski et al. |
| D611,202 S | 3/2010 | Jakubowski et al. |
| D615,251 S | 5/2010 | Scherbing |
| D617,958 S | 6/2010 | Benincasa |
| 7,802,540 B2 | 9/2010 | Jakubowski |
| 8,127,715 B2 | 3/2012 | Leung |
| 8,127,719 B2 | 3/2012 | Jakubowski |
| 8,132,537 B2 | 3/2012 | Trunnell |
| D659,294 S | 5/2012 | Veness et al. |
| D671,691 S | 11/2012 | Neilan |
| 8,336,500 B1 | 12/2012 | Britt |
| D680,696 S | 4/2013 | Hammel |
| 8,408,416 B2 | 4/2013 | Cheng-Lung et al. |
| 8,413,472 B2 | 4/2013 | Chiang |
| D692,621 S | 10/2013 | Ganahl |
| 8,544,417 B2 | 10/2013 | Sangl |
| D696,473 S | 12/2013 | Ganahl |
| 8,613,260 B2 * | 12/2013 | Veness ................ A01K 1/0245 119/484 |
| D703,876 S | 4/2014 | Chance et al. |
| 8,733,292 B2 | 5/2014 | Nichols |
| 8,757,095 B2 * | 6/2014 | Farmer ................ A01K 1/0254 119/499 |
| 29,492,682 | 6/2014 | Edmonds |
| D713,099 S | 9/2014 | Chance et al. |
| D717,005 S | 11/2014 | Skaggs |
| D720,503 S | 12/2014 | Lloyd |
| 9,095,120 B1 | 8/2015 | Skaggs |
| 9,119,375 B2 | 9/2015 | Flannery et al. |
| 9,370,165 B2 | 6/2016 | de Bien |
| 9,392,766 B1 | 7/2016 | Elden |
| D768,941 S | 10/2016 | Edmonds |
| D808,596 S | 1/2018 | Veness |
| D822,912 S | 7/2018 | Edmonds |
| D823,544 S | 7/2018 | Nguyen |
| D827,211 S | 8/2018 | Cronkhite |
| D827,212 S | 8/2018 | Cronkhite |
| D833,085 S | 11/2018 | Edmonds |
| 2002/0113389 A1 | 8/2002 | Robinson |
| 2004/0016409 A1 | 1/2004 | Schwinghammer et al. |
| 2004/0026935 A1 | 2/2004 | Tang |
| 2004/0065270 A1 | 4/2004 | King |
| 2004/0134444 A1 * | 7/2004 | Shiever ................ A01K 1/0245 119/496 |
| 2004/0194723 A1 | 10/2004 | Farmer |
| 2005/0103279 A1 | 5/2005 | Brewer |
| 2005/0241593 A1 | 11/2005 | Kaura |
| 2005/0284399 A1 | 12/2005 | Asma |
| 2006/0048716 A1 | 3/2006 | Garofola |
| 2006/0169218 A1 | 8/2006 | Chang |
| 2007/0056524 A1 | 3/2007 | Barca |
| 2007/0157890 A1 | 7/2007 | Kaura |
| 2007/0278755 A1 | 12/2007 | Jack |
| 2008/0022938 A1 | 1/2008 | Callan |
| 2008/0245313 A1 | 10/2008 | Jakubowski et al. |
| 2009/0011210 A1 | 1/2009 | Gao |
| 2009/0101075 A1 | 4/2009 | Matlack |
| 2009/0205578 A1 | 8/2009 | Alves |
| 2009/0223461 A1 | 9/2009 | Trunnell et al. |
| 2010/0043720 A1 | 2/2010 | Yelverton |
| 2010/0066041 A1 | 3/2010 | Metzger |
| 2010/0192870 A1 | 8/2010 | Wood |
| 2010/0282179 A1 | 11/2010 | Ho |
| 2011/0220033 A1 * | 9/2011 | Sangl .................. A01K 1/0245 119/455 |
| 2012/0037083 A1 * | 2/2012 | Greene .................. A01K 1/034 119/497 |
| 2013/0055962 A1 * | 3/2013 | Scoggins ............ A01K 13/001 119/453 |
| 2013/0220231 A1 * | 8/2013 | Hovsepian ........... A01K 1/0281 119/496 |
| 2013/0233250 A1 | 9/2013 | Veness et al. |

(56) References Cited

U.S. PATENT DOCUMENTS

| | | | |
|---|---|---|---|
| 2013/0247833 A1* | 9/2013 | de Bien | A01K 1/0245 |
| | | | 119/453 |
| 2014/0083366 A1 | 3/2014 | Veness | |
| 2014/0137483 A1 | 5/2014 | Tong | |
| 2014/0216356 A1 | 8/2014 | Glover et al. | |
| 2015/0034018 A1 | 2/2015 | Edmonds | |
| 2015/0125250 A1 | 5/2015 | Sindlinger | |
| 2016/0192614 A1 | 7/2016 | Hawk | |
| 2016/0192615 A1 | 7/2016 | Parness | |

FOREIGN PATENT DOCUMENTS

| | | |
|---|---|---|
| FR | 1260572 | 1/1972 |
| FR | 2496104 | 7/1986 |
| FR | 2815817 | 5/2002 |
| FR | 2974972 | 11/2012 |
| GB | 503104 | 3/1939 |
| WO | 9918317 A1 | 4/1999 |
| WO | WO2015021053 | 8/2014 |

OTHER PUBLICATIONS

U.S. Appl. No. 29/535,995, filed Aug. 12, 2015, assignee Edmonds Outdoors, LLC.

U.S. Appl. No. 29/539,652, filed Sep. 16, 2015, assignee Edmonds Outdoors, LLC.

U.S. Appl. No. 15/427,037, filed Feb. 7, 2017, assignee Edmonds Outdoors, LLC.

U.S. Appl. No. 15/011,453, filed Jan. 29, 2016, assignee Edmonds Outdoors, LLC.

U.S. Appl. No. 15/291,048, filed Oct. 11, 2016, assignee Edmonds Outdoors, LLC.

U.S. Appl. No. 16/285,095, filed Feb. 25, 2019, assignee Edmonds Outdoors, LLC.

U.S. Appl. No. 16/290,880, filed Mar. 2, 2019, assignee Edmonds Outdoors, LLC.

U.S. Appl. No. 16/290,885, filed Mar. 2, 2019, assignee Edmonds Outdoors, LLC.

U.S. Appl. No. 16/290,890, filed Mar. 2, 2019, assignee Edmonds Outdoors, LLC.

"Gunnar Kennel". Found on line Jun. 22, 2016 at youtube.com. Page dated May 14, 2015. Retrieved from https://www.youtube.com/watch?v=zoM MV An hu30.

"Mud River Dixie Kennel Cover." Found online Apr. 11, 2018 at www.amazon.com. Page dated Dec. 13, 2014. Retrieved from URL: https://goo.gl/XBrdqZ (Year: 2014).

"Pet Travel Carvers and Crates—Crash Test Results". Found on line Jun. 22, 2016 at gopetfriendlyblog.com. Page dated 3713012015. Retrieved from http://www.gopetfriendlyblog.com/pet-travel-carriers-and-crates-crash-test-resu lts/.

"Dog Crate Door: How We Made it Stronger and Escape-Proof". Found on line Jun. 22, 2016 at gunnerkennels.com. Page dated Jun. 10, 2015. Retrieved from https ://www .gun nerken nels.com/blog/dog-crate-door-how-we-made-it-stronger-and-escape-proof.

"Alumni Profile: Addison Edmonds". Found on line Jun. 22, 2016 at olemissalumni.com. Page dated Mar. 1, 2015. Retrieved from http://www.olemissalumni.com/alumni-profile-addison-edmonds/.

"ArcticShield Kennel Covers." Found online Apr. 11, 2018 at www.youtube.com. Page dated Jul. 14, 2015. Retrieved from URL: https://www.youtube.com/watch?v=R3XSN-cPQSE (Year: 2015).

"Classic Accessories Insulated Dog Kennel Jacket." Found on line Apr. 11, 2018 at www.amazon.com. Page dated 0710212010. Retrieved from URL: https://www.amazon.com/classic-accessories-insulated-kennel-realtree/dp/b000pd8cck (Year: 2010).

U.S. Appl. No. 29/644,742, filed Apr. 20, 2018, assignee Edmonds Outdoors, LLC.

* cited by examiner

ANIMAL ENCLOSURE

CROSS-REFERENCES TO RELATED APPLICATIONS

This application claims benefit of and priority to the following patent application which is hereby incorporated by reference in its entirety: U.S. Provisional Patent Application Ser. No. 61/862,393, filed Aug. 5, 2013 entitled "Pet Crate With Double Wall Roto-Molded Construction".

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present invention relates generally to structures for housing animals and more particularly to portable pet kennels and pet crates. In some embodiments, the present invention relates to portable pet crates for housing or transporting dogs.

Various types of structural enclosures for storing and transporting animals are known in the art. Conventional portable animal crates such as those used for housing and transporting dogs typically include a plastic or metal wire construction and include an interior enclosure with a selectively openable door. Conventional portable animal crates generally include a single-layer construction such as a single layer of plastic, metal or wire mesh. The single-layer material forms the structural support and also defines the enclosure space within the interior of the crate. Conventional single-layer animal crates of this type are generally sized to easily fit in the bed of a truck or the cargo area of a sport-utility vehicle, and such crates are often used by sportsmen, disabled persons, rescue, military and/or law enforcement personnel for storing and transporting dogs. Such conventional portable animal crates provide a benefit of being relatively lightweight and portable such that a single person can lift and move the crate. Additionally, these types of conventional animal crates are generally sized to accommodate only the animal or animals to be housed within, thereby enhancing the portable nature of the product.

One problem with conventional single-layer portable animal crates is the lack of structural integrity and toughness of construction. A single-layer material wall may easily deflect or buckle under a load, potentially harming the animal housed within the enclosure. For example, owners of portable animal crates may regularly move the crate between a house and a vehicle or other location. During repeated movement of the crate, conventional single-layer animal crates may be inadvertently dropped or impacted resulting in cracks or dents in the material. Also, while travelling in a vehicle, conventional portable single-layer animal crates may be crushed or severely deformed during a vehicle accident or other impact. Such deformation may severely injure or kill the animal housed within the enclosure.

Additionally, conventional animal crates having single-layer material walls provide little insulation to animals housed within the enclosure in cold weather, especially when transported in an exposed environment such as the bed of a pickup truck. Such conditions are frequently experienced by sportsmen when transporting sporting dogs during winter hunting seasons. To overcome this problem, users of such conventional single-walled animal crates are often forced to cover the crate with an insulating blanket or crate cover when transporting an animal in cold weather. However, conventional crate covers and blankets are expensive, cumbersome, may become torn or ripped, and further may be blown off the crate or become misaligned during use.

Another problem with conventional portable animal crates is the range of motion of the door. Conventional animal crates typically include a metal or wire mesh screen door that is pivotable relative to the frame surrounding the door opening. Conventional doors for animal crates have a range of motion from a closed position to a maximum open position between 90 and 180 degrees away from the door opening where the door encounters a door stop. At such a maximum open position, the door extends away from the crate in a precarious location. While at the maximum open position, conventional animal crate doors—if forced further in the opening direction—may break or cause damage to the crate. Further, such conventional doors require additional space around the kennel to accommodate the door when in the maximum open position. This is undesirable when using a crate in a constant door-open configuration in a space-limited environment such as in a home, automobile, or in the field. In many applications it is generally desirable to provide a crate door with a maximum open position consuming the least amount of space around the crate. Others have attempted to overcome this problem by providing a crate door that is detachable. However, such solutions are often inadequate because the attachment and detachment procedures are cumbersome, and the door may be broken, damaged or lost when detached.

A further problem with conventional portable animal crates is the interior environment may become soiled during use. For example, many portable plastic animal crates include a bottom that is continuously molded into the side walls rising from the bottom. As such, any liquid or animal waste accumulation inside the bottom of the crate will remain in the crate. When such crates are used with wet animals or in wet conditions, water and mud has a tendency to accumulate in the bottom of the crate. This generally creates an uncomfortable environment for the animal. Moreover, the accumulation of water in the bottom of an animal crate may be harmful to animals in wet cold conditions such as those experienced by sporting dogs during winter hunting seasons. Additionally, the lack of drainage in the crate makes it difficult to wash out the interior of the crate with a spray hose.

A further problem with conventional portable animal crates includes the inability of a crate to be easily secured to a structure such as the bed of a pickup truck or the interior of a sport utility vehicle. During travel, it is often preferable to have the crate securely tied down to a rigid object. Many conventional plastic animal crates do not include external attachment points for securing webbing, rope, or other supports to the crate. Users of conventional crates often place tie-downs over the roof of the crate. However, without attachment points, the tie-down material may slip or become dislodges, especially during wet weather, or during a highimpact situation such as a vehicle accident. When a tie-down becomes loose, the crate may undesirable separate from the vehicle and further injure the animal housed within. Conventional animal crates also have a tendency to slide on surfaces when unsecured. This may further enhance the potential for damage to the crate and/or the animal inside the crate during transport.

What is needed, then, are improvements to animal enclosures to address these and other problems.

BRIEF SUMMARY

The present disclosure provides a portable animal crate having numerous features to address one or more of the problems noted above.

In some embodiments, the present disclosure provides a portable animal enclosure apparatus including an inner wall defining an enclosure shaped to house the animal, an outer wall at least partially surrounding the inner wall, and a gap defined between the inner and outer walls. In some embodiments, the enclosure is rotational molded.

In further embodiments, the present disclosure provides a portable animal kennel apparatus including a kennel body having an inner wall, an outer wall, and an opening shaped to allow the animal to enter and exit the kennel. A door is pivotally attached to the kennel body at a door hinge. The door is moveable from a closed position covering the opening to an open position greater than about 180 degrees from the closed position alongside the outer wall of the kennel body. In some embodiments, the kennel apparatus is rotational molded.

Another embodiment of the present disclosure provides a portable animal kennel apparatus including a first housing member including a first inner wall and a first outer wall spaced by a first wall gap, and a second housing member including a second inner wall and a second outer wall spaced by a second wall gap. The first and second housing members are securable together to form a housing for the animal. In some embodiments, the first and second housing members are both rotational molded.

In some embodiments, it is an object of the present disclosure to provide a double-walled animal crate for housing animals during transportation.

A further object of the present disclosure in some embodiments is to provide an animal crate having improved structural rigidity and stability.

Yet another object of the present disclosure in some embodiments is to provide an animal crate with improved thermal insulation of the enclosed space, during hot and/or cold conditions.

Another object of the present disclosure in some embodiments is to facilitate attachment of the animal crate to a structure using integral attachment bars.

A further object of the present disclosure in some embodiments is to prevent the crate from slipping across a surface during use by using non-skid feet.

Yet another object of the present disclosure in some embodiments is provide an animal crate with a moat and drain hole that will allow liquid accumulation to exit the interior of the crate.

Numerous other objects, features and advantages of the present invention will be readily apparent to those skilled in the art upon a reading of the following disclosure when taken in conjunction with the accompanying drawings.

DETAILED DESCRIPTION

Figure 1:
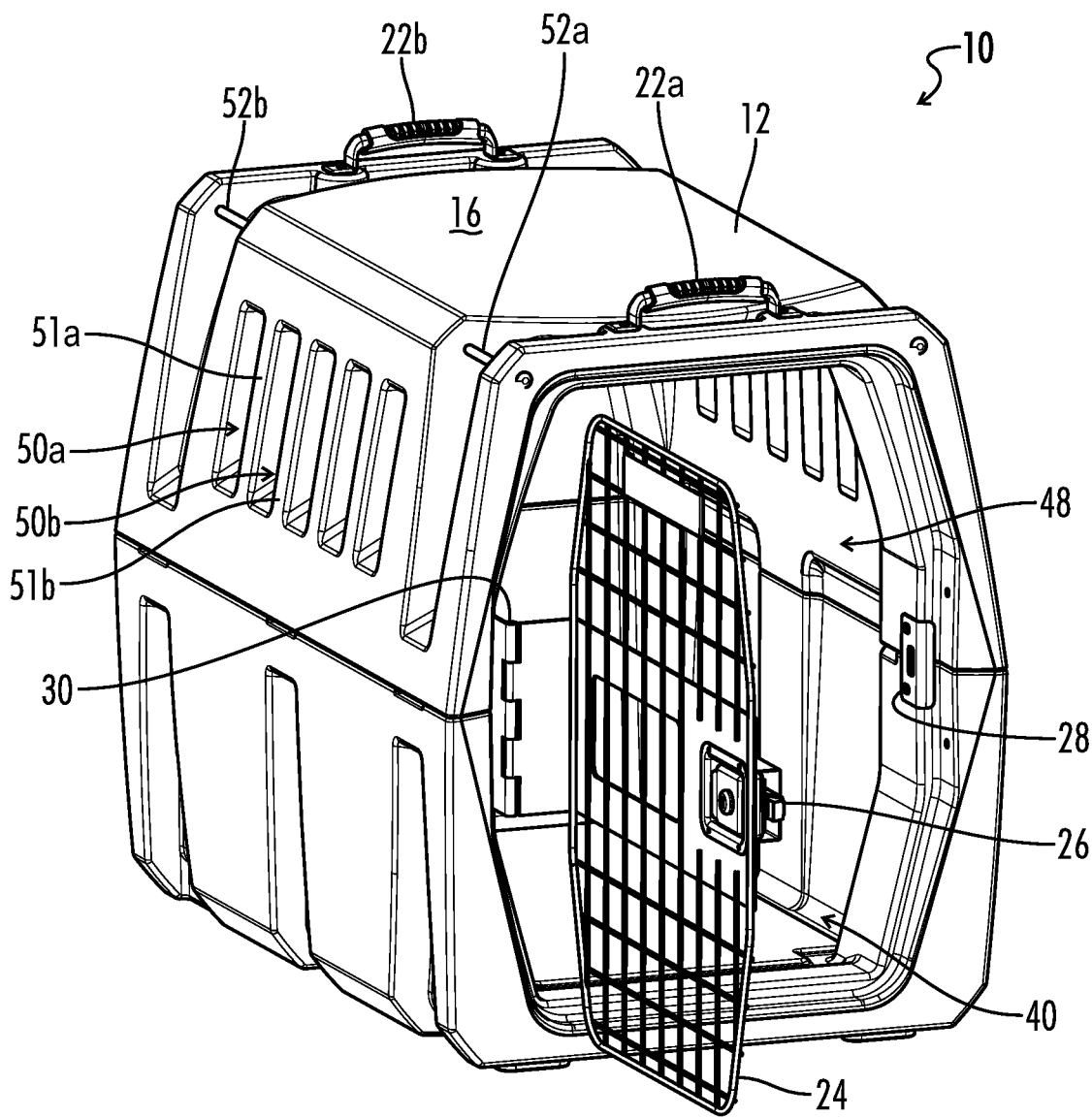
FIG. 1 illustrates a perspective view of an embodiment of an animal crate in accordance with the present disclosure.

Referring now to the drawings, FIG. 1 illustrates an embodiment of an animal crate designated by the numeral 10. Animal crate, animal enclosure, or kennel 10, includes a housing or kennel body 12 defining an interior space shaped and sized to accommodate one or more animals. In some embodiments, kennel body 12 is shaped to accommodate a dog. Kennel 10 is also shaped and sized to be portable in some embodiments. The size and shape of kennel 10 allows kennel 10 to be easily transported from a residence or building to a vehicle or other mode of transportation. Additionally, in some embodiments, kennel 10 is portable and is shaped and sized to comply with one or more regulations for traveling with pets on commercial airlines.

Kennel 10 includes a door 24 hingedly attached to the kennel body 12. Door 24 includes a metal wire construction to allow airflow through the door into and out of the interior enclosure in some embodiments. Door 24 includes a latch 26 selectively engageable with a corresponding strike-plate 28. The strike-plate 28 is mounted on the door frame adjacent the door opening 48 to provide additional rigidity. When door 24 is fully closed, door 24 covers door opening 48. Door 24 is pivotable about a door hinge 30 located on or near kennel body 12. Door 24 may freely rotate about door hinge 30 to open or close door 24.

Kennel 10 also includes first and second handles 22a, 22b positioned on the kennel body 12. In some embodiments, first and second handles 22a, 22b are located on the kennel roof 16 at front and rear positions in some embodiments. Handles 22 may include any suitable handles, and in some embodiments include a nylon webbing material with a rubberized grip region. Handles 22 are secured to kennel body 12 using one or more handle fasteners. As such, the handles 22 may be removed and replaced in the event a handle becomes damaged or worn.

Kennel body 12 includes a two-piece construction in some embodiments. Kennel body 12 includes an upper crate housing 18 and a lower crate housing 20, seen in FIGS. 2-6. Each of upper and lower crate housing members 18, may be formed independently of each other and subsequently joined together to form kennel 10. In some embodiments, upper and lower crate housing members 18, 20 are secured together using one or more fasteners 78a, 78b, 78c, etc. seen in FIG. 6. Each fastener extends between upper and lower crate housing members 18, 20 to provide a connection between the members. In some embodiments, lower crate housing member 20 includes a plurality of fastener holes 58 to allow passage of fasteners 78. A corresponding socket or other fastener receiver may be located at a corresponding location on upper crate housing member 18. In some embodiments, threaded sockets 74 are molded into upper crate housing member 18 to receive a threaded end of a fastener 78 inserted upwardly toward upper crate housing member 18. In alternative embodiments, threaded sockets are installed in lower crate housing member to receive fasteners installed through corresponding fastener holes defined in the upper housing member 18.

Kennel 10 may be provided fully assembled using fasteners 78, or may be sold with upper and lower crate housing members 18, 20 separated to reduce packaging size. Kennel 10 is configured in some embodiments such that a user may construct or disassemble the upper and lower crate housing members 18, 20 together simply by stacking the members and installing or removing fasteners 78. To ease the assembly procedure, in some embodiments, lower crate housing member 20 includes one or more pilot protrusions 66a, 66b, 66c extending upwardly toward upper crate housing member 18. Each pilot protrusion 66 is shaped to fit in a corresponding pilot recess 68a, 68b, 68c defined in a corresponding lower edge of upper crate housing member 18. In some embodiments, each pilot protrusion 66 and pilot recess 68 is formed surrounding a fastener hole 58. This arrangement allows upper and lower crate housing members 18, 20 to be biased to an aligned position when stacked such that it becomes easier to install fasteners 78.

Figure 12A:
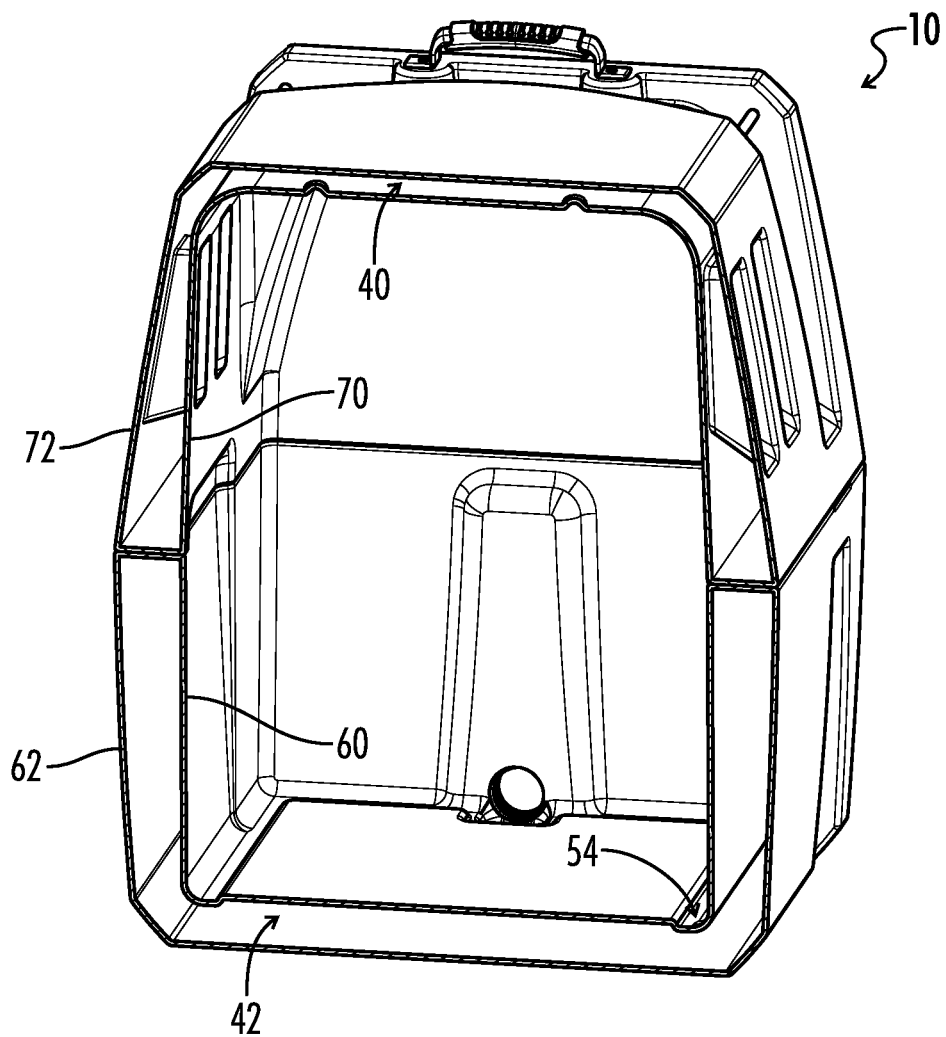
FIG. 12A illustrates a partial cross-sectional view of Section 12A-12A from FIG. 11.

Kennel 10 includes a double-walled construction in some embodiments. As such, kennel 10 includes an inner wall and an outer wall. The inner and outer walls are separated by a gap, and a space is provided between the inner and outer walls, as seen in FIG. 12A. An upper gap 40 shown in FIG. 12A is defined between inner and outer walls on upper crate housing member 18, and a lower gap 42 is defined between inner and outer walls on lower crate housing member 20. A plurality of integrated support standoffs, or kiss-offs, may be positioned in the gap to provide local structural support between opposing walls. Each support standoff may extend from an outer wall to an inner wall, or vice versa, to provide a local structural reinforcement. Each standoff at its maximum depth may contact the opposing wall. In some embodiments, each standoff at its maximum depth engages and is molded to the opposing wall. In some embodiments, the gap between inner and outer walls is filled with air. As such, kennel 10 in some embodiments includes a region of air space between inner and outer walls. The region of air space may provide enhanced insulation for the kennel without adding significant weight. This is advantageous in many applications, as the air insulation layer may provide improved thermal performance in both hot and cold conditions. Additionally, the double-walled construction including inner and outer walls separated by a gap provides greater strength and resistance to impact as compared to conventional single-walled animal crates. Referring further to FIG. 12A, in some embodiments, upper crate housing member 18 includes an upper inner wall 70 and an upper outer wall 72. Upper inner and outer walls 70, 72 may be continuously formed from a plastic or polymer material in some embodiments. Similarly, lower crate housing member 20 includes a lower inner wall 60 and a lower outer wall 62. Lower inner and outer walls 60, 62 may also be continuously formed from a plastic or polymer material in some embodiments.

Figure 12B:
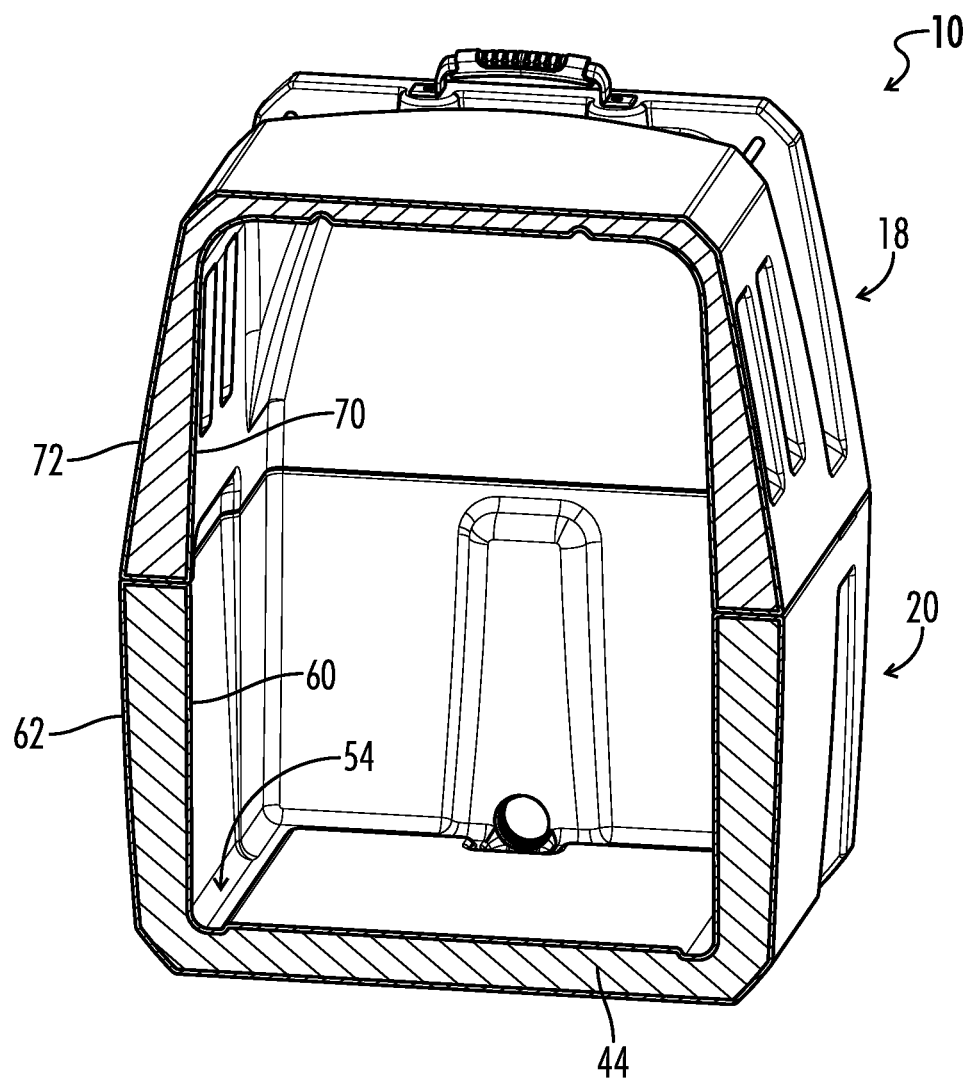
FIG. 12B illustrates a partial cross-sectional view of Section 12B-12B from FIG. 11 in an alternative embodiment.
Figure 13A:
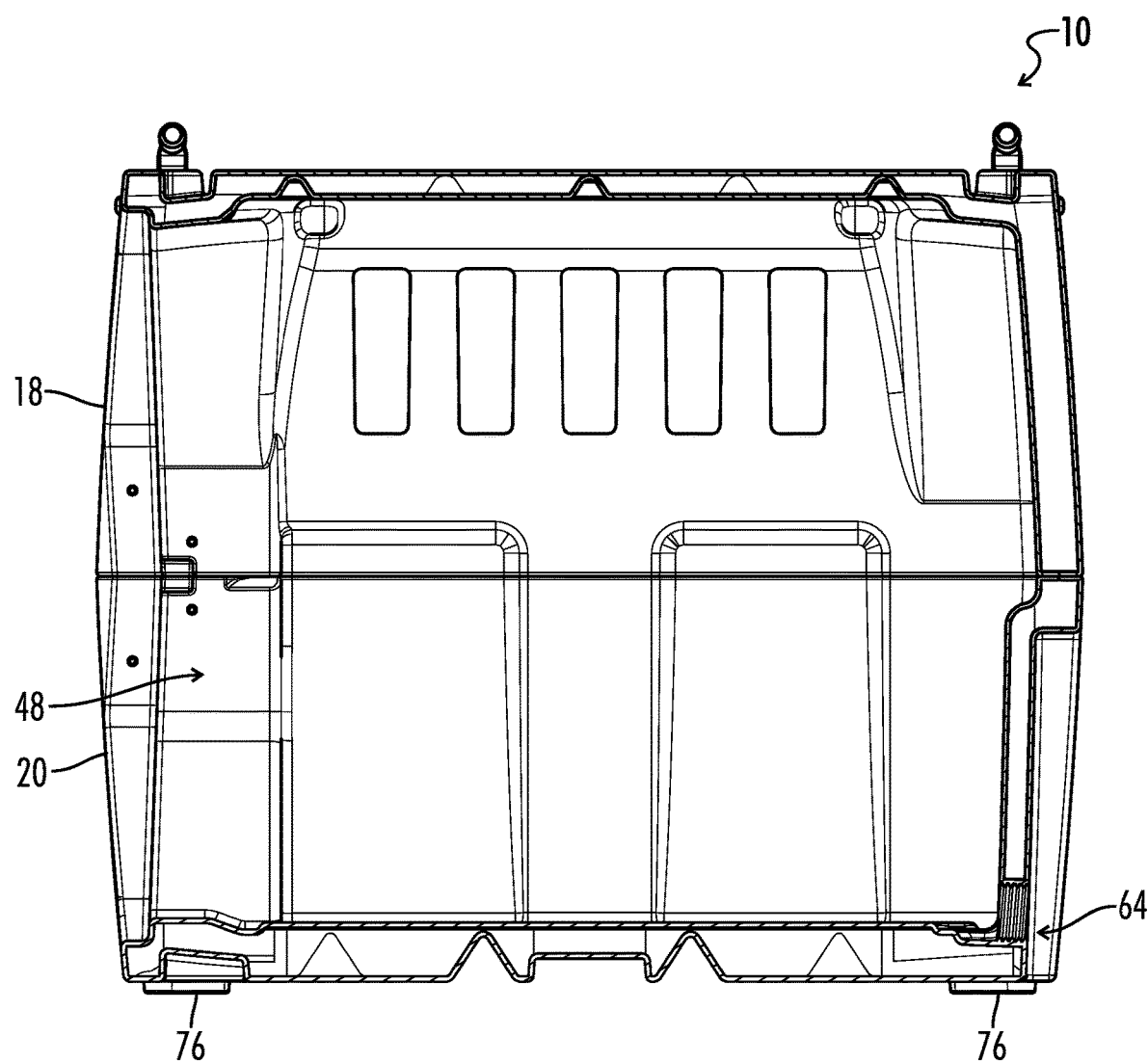
FIG. 13A illustrates a partial cross-sectional view of Section 13A-13A from FIG. 9 in an alternative embodiment.
Figure 13B:
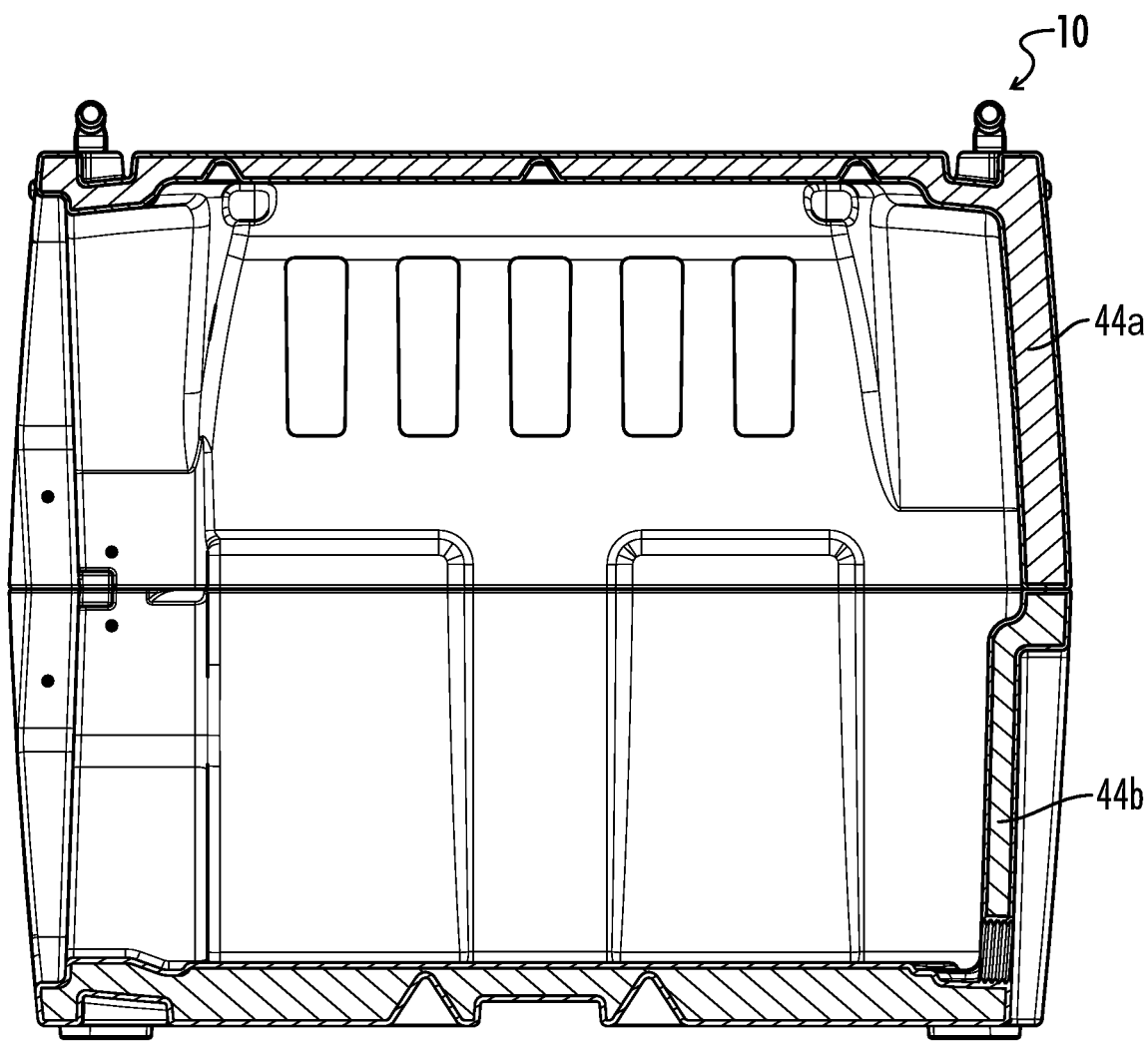
FIG. 13B illustrates a partial cross-sectional view of Section 13B-13B from FIG. 9 in an alternative embodiment.

As seen in FIG. 12B, in some embodiments, the gap between inner and outer walls is filled with a filler material. The filler material 44 may include a foam or expanded foam material in some embodiments. Alternatively, filler material 44 may include a fiber, resin, polymer, or any other suitable filler material. Filler material 44 spans the gap between inner and outer walls on upper and/or lower crate housing members 18, 20. Filler material 44 provides additional strength to kennel body 12. Filler material 44 also provides additional thermal insulation for keeping the interior of kennel 10 cool or warm. In some embodiments, upper crate housing member 18 includes a first filler material 44a, and lower crate housing member 20 includes a second dissimilar material 44b. In other embodiments, first and second filler materials 44a, 44b are substantially the same. In some embodiments, only one of upper and lower crate housing members includes a filler material.

Although the double-walled construction of kennel body 12 may be formed using any suitable process, in some embodiments, kennel body 12 includes a double-walled construction formed using a rotational molding manufacturing process, sometimes referred to as roto-molding. In such embodiments, upper crate housing member 18 is formed independently of lower crate housing member 20. In separate molds. In alternative embodiments, kennel body 12 includes a single rotational molded unitary construction having inner and outer walls, and kennel 10 is not split into upper and lower crate housing members. In some embodiments, the inner and outer walls are continuously formed in a molding process and are joined continuously around the edges. This provides a unitary molded object with a double-walled construction for each component of kennel body 12. The continuous one-piece construction having inner and outer walls increases strength for the kennel 10 and improves thermal performance.

Figure 14:
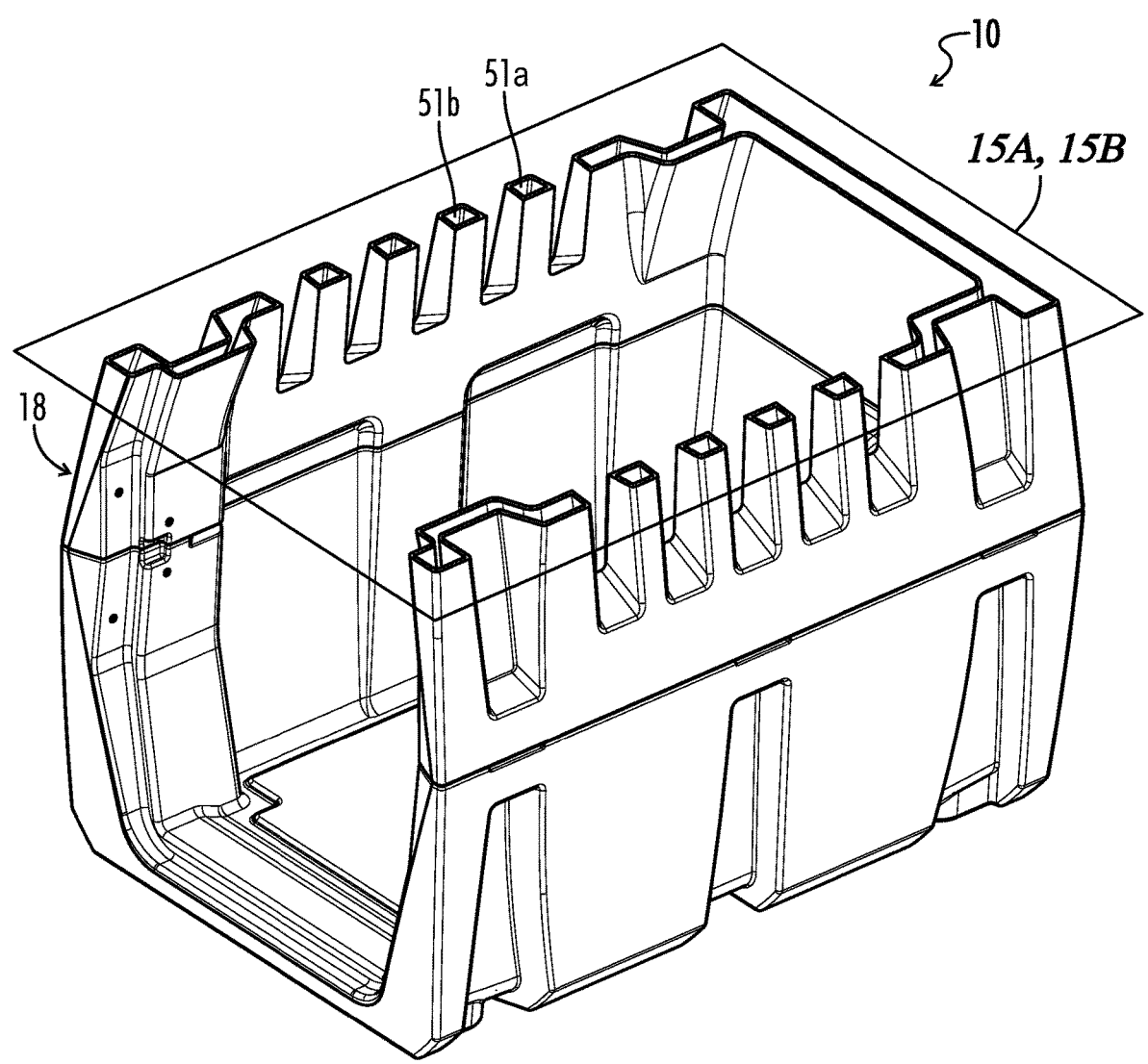
FIG. 14 illustrates a perspective view of an embodiment of an animal crate having a cross-sectional plane of reference.

Kennel 10 also includes a plurality of vent holes, or windows 50a, 50b, etc. Each vent hole provides an opening in a side of the kennel to allow air to flow into or to leave the enclosed space within the interior of the kennel. Each vent hole 50 is bordered by upright vent supports 51a, 51b, etc. Vent holes 50 and corresponding vent supports 51 may be located in upper crate housing member 18 only, in lower crate housing member 20 only, or on both upper and lower crate housing members 18, 20. Each vent support 51 provides increased structural rigidity and strength to the kennel 10. For example, a double-walled region may typically include only two layers with a space or filler material in between. However, vent supports 51 provide two extra local transverse walls facing adjacent vents, further increasing strength. As seen in a cross-sectional view in FIG. 15A taken along the plane 15A from FIG. 14, an embodiment of a vent support 51a includes an outer support wall 53a, an inner support wall 53b, a first side support wall 53c facing first vent hole 50a, and a second side support wall 53d opposite first side support wall and facing second vent hole 50b. The addition of first and second side support walls 53c, 53d provides transverse walls that provide additional strength to the kennel 10. The supports 51 also provide reinforcement in the area around a pet's head when located on upper crate housing member 18, as seen in FIG. 18A.

Figure 11:
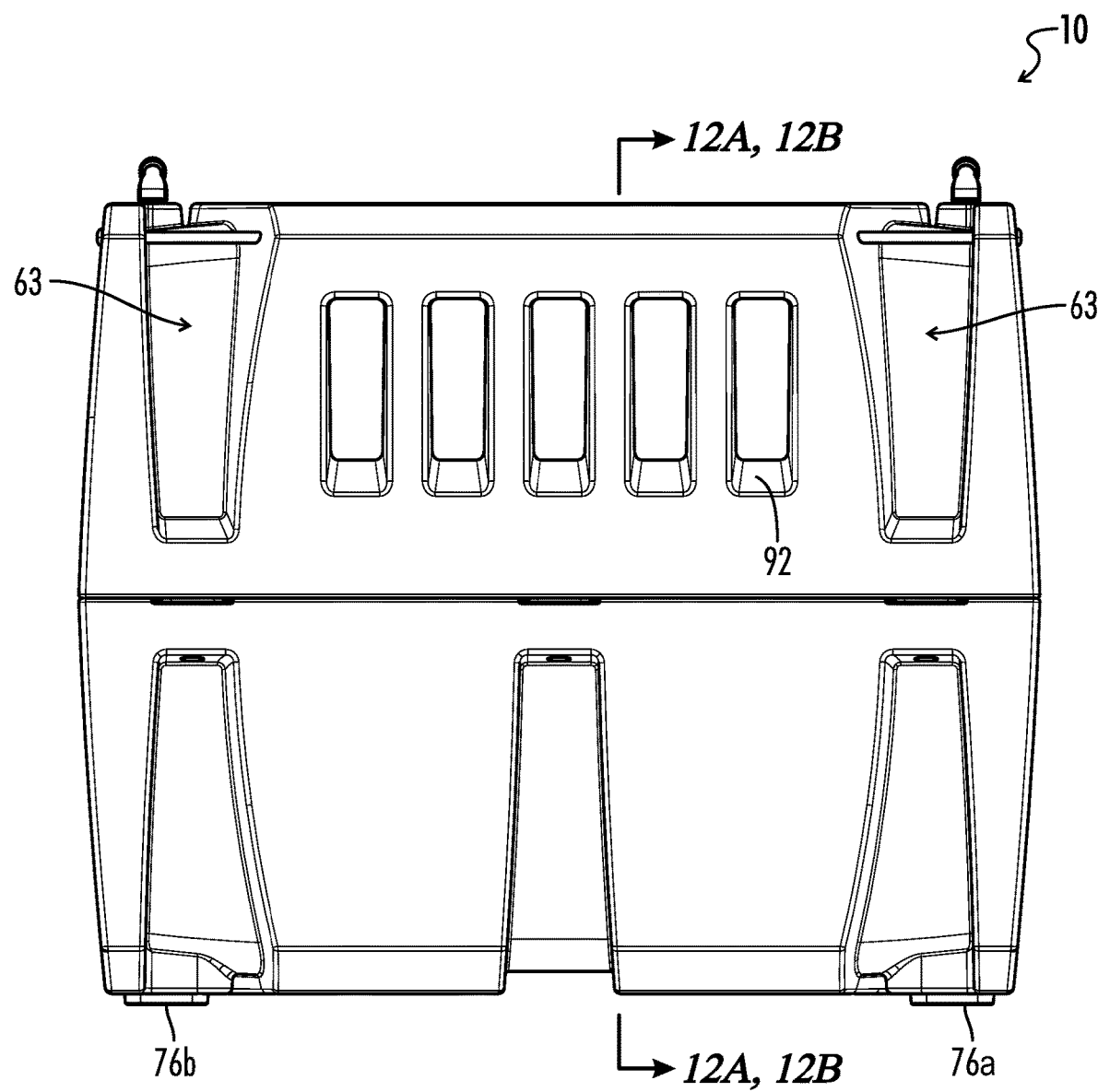
FIG. 11 illustrates a side elevation view of an embodiment of an animal crate in accordance with the present disclosure.
Figure 15A:
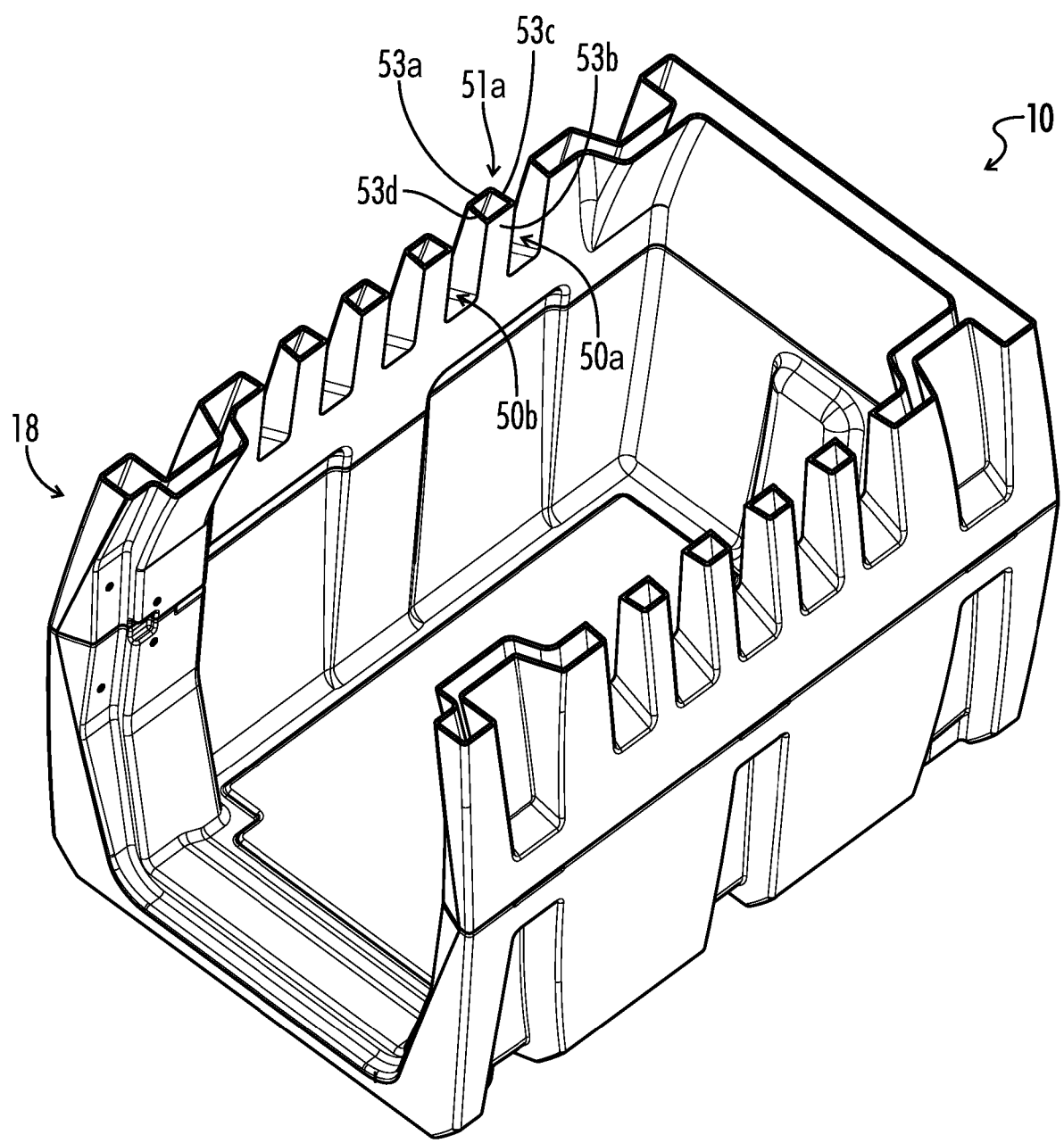
FIG. 15A illustrates a partial cross-sectional perspective view of an embodiment of an animal crate with an air gap between inner and outer walls.
Figure 15B:
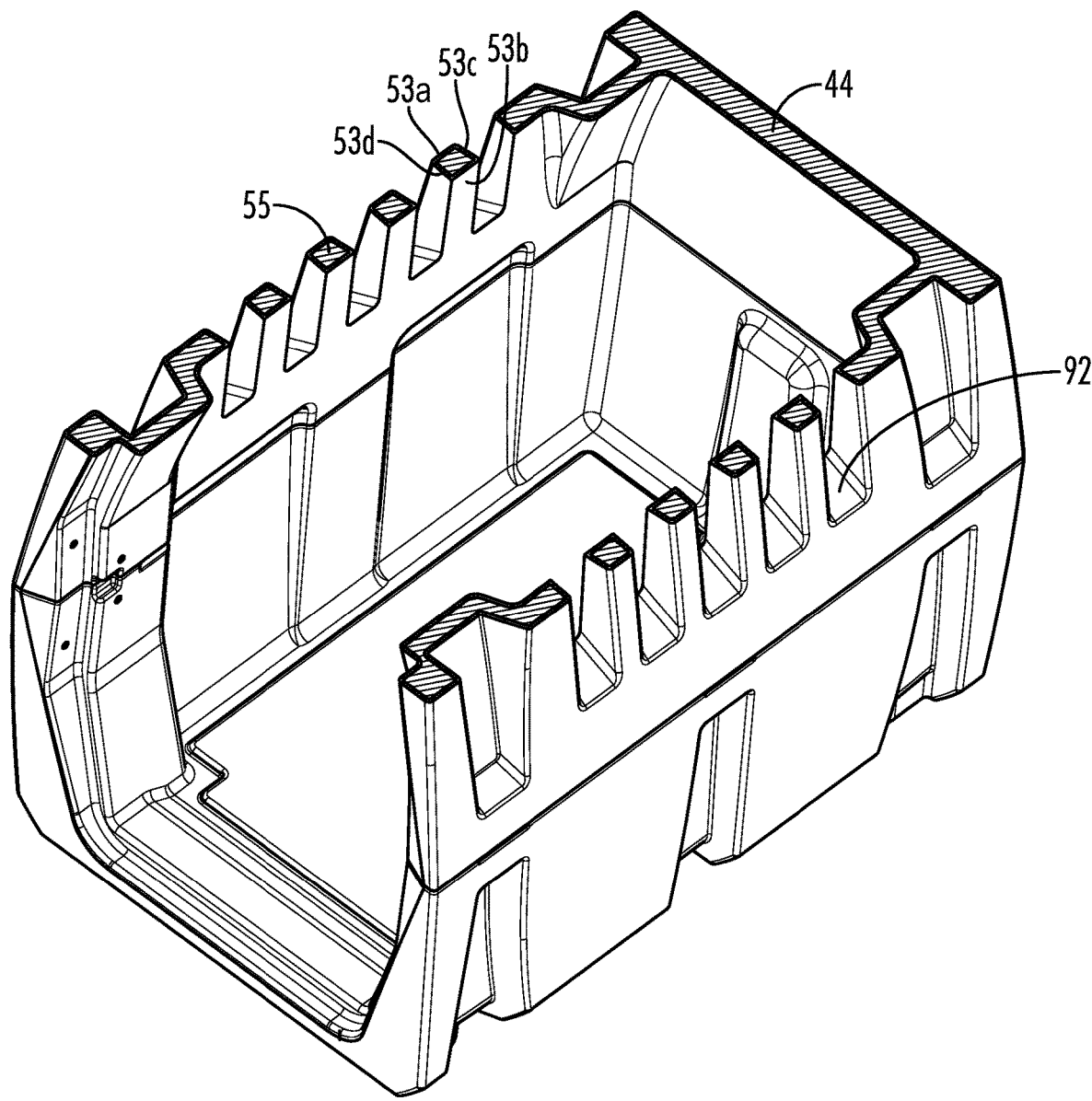
FIG. 15B illustrates a partial cross-sectional perspective view of an embodiment of an animal crate having a filler material between inner and outer walls.

As seen in FIG. 11 and FIG. 15B, an inclined vent ramp 92 is defined at the lower end of each vent hole 50 in some embodiments. Each vent ramp 92 includes a sloped surface, sloping downwardly from the local inner wall to the outer wall. The vent ramp 92 having a surface that slopes downwardly from the inner wall toward the outer wall allows rain or other moisture incident on the region between vent supports to drain outwardly away from the interior of the kennel 10. This helps to keep the interior of the kennel dry when transported or used in wet conditions.

As seen in FIG. 15A, each support 51 may include a hollow interior region filled with air. In other embodiments, as seen in FIG. 15B, each upright support includes a filler material 44 that is dispersed throughout the region between inner and outer walls on kennel body 12. Although upright supports 51 are shown in a vertical orientation in the figures, the supports 51 may include other angled or curved upright orientations in other embodiments.

Figure 3:
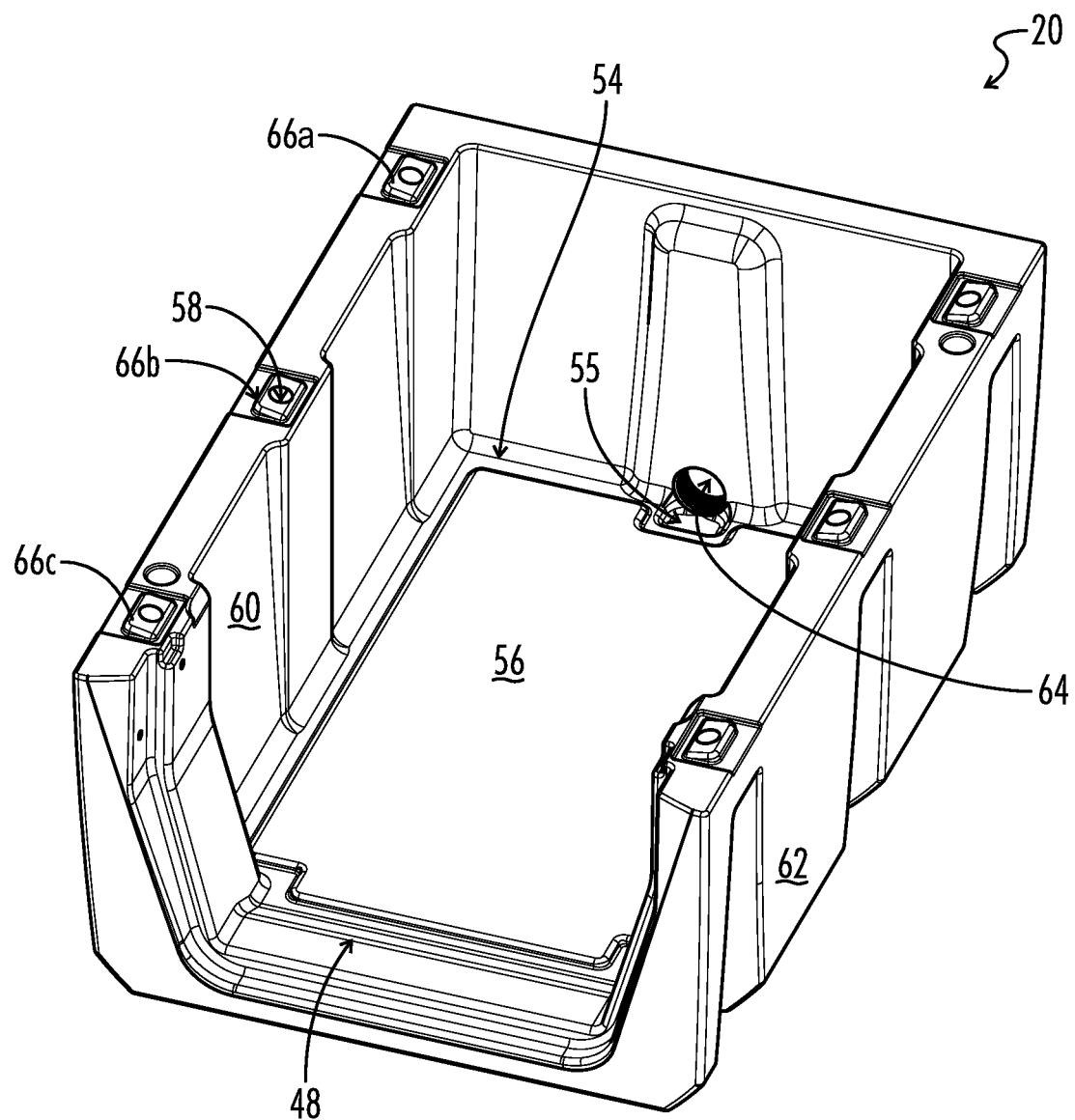
FIG. 3 illustrates a perspective view of an embodiment of a lower housing member for an animal crate in accordance with the present disclosure.
Figure 4:
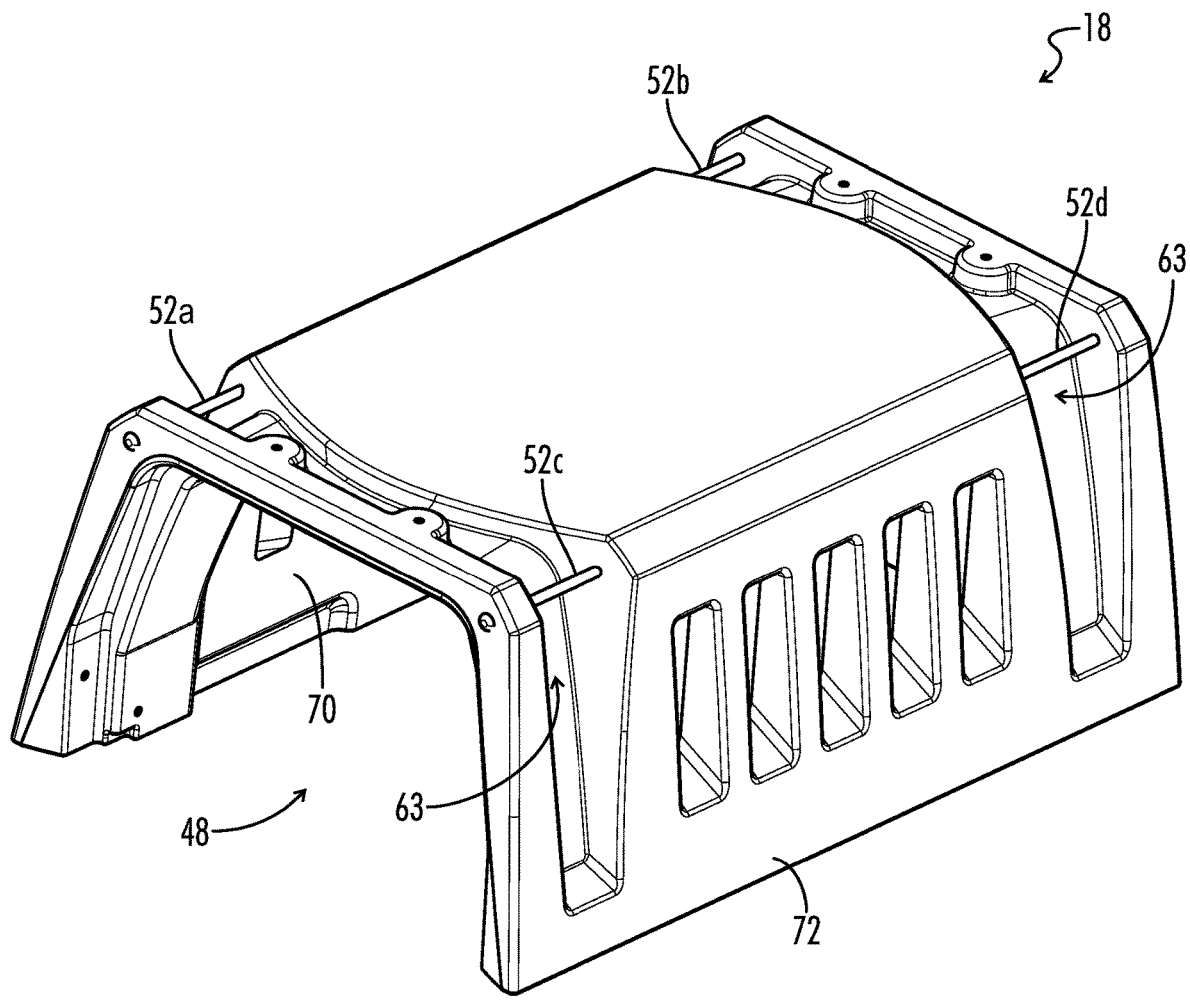
FIG. 4 illustrates a perspective view of an embodiment of an upper housing member for an animal crate in accordance with the present disclosure.

Referring further to FIG. 3 and FIG. 12A, in some applications, a moat 54 is defined around the perimeter of floor 56 on the interior of kennel body 12, and particularly on lower crate housing member 20. Moat 54 provides a recessed region for draining water off of floor 56. Moat 54 includes a slightly lower elevation than the floor 56. In some embodiments, moat 54 includes a depth greater than about ½ inch. In other embodiments, moat 54 includes a depth of between about ½ inch and about two inches. As such, liquid inside the enclosure may accumulate in moat 54 while floor 56 stays relatively dry.

Figure 10:
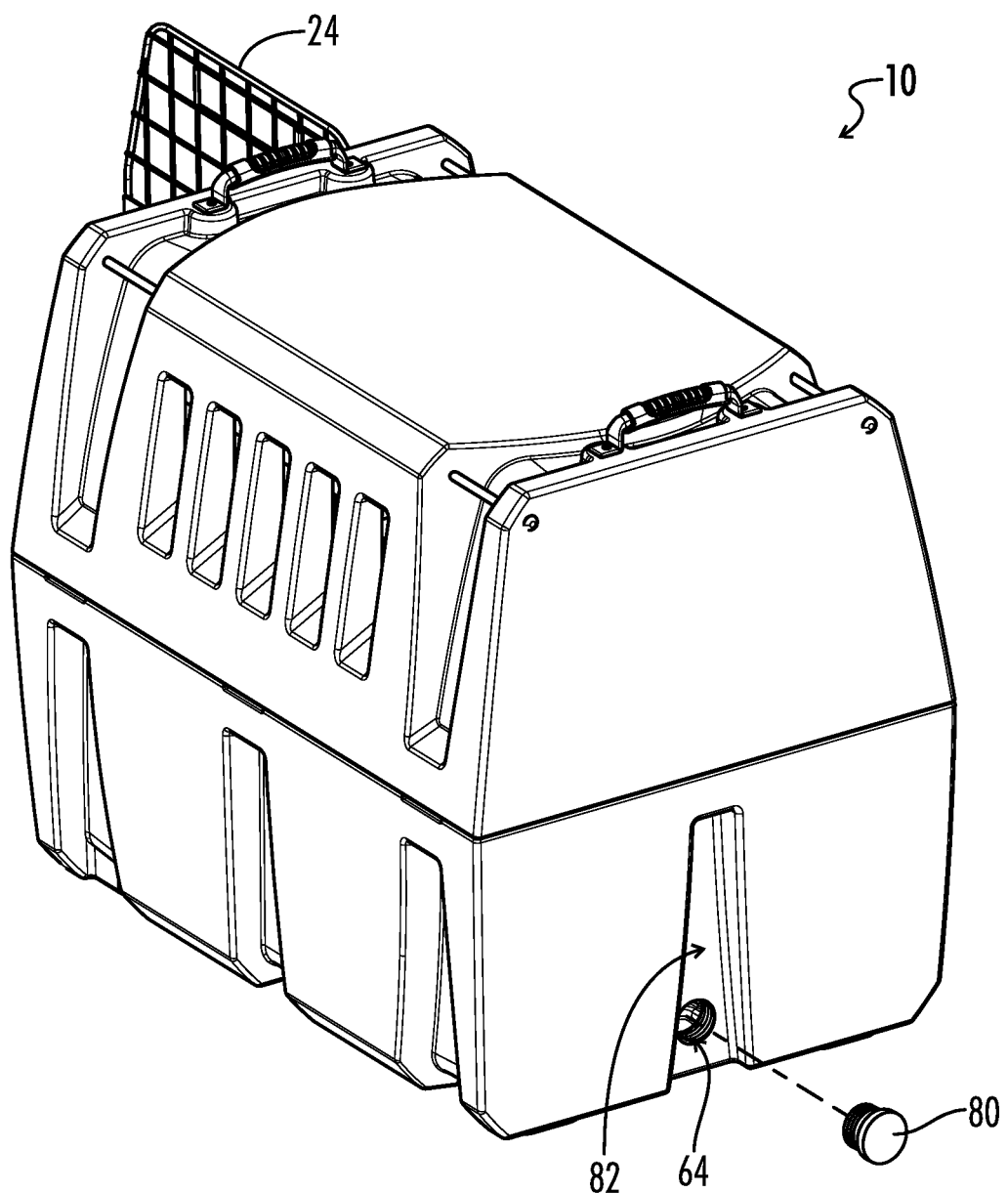
FIG. 10 illustrates a rear perspective view of an embodiment of an animal crate in accordance with the present disclosure.

Additionally, in some embodiments, a drain hole 64 is defined in one or more walls of kennel body 12. In some embodiments, drain hole 64 is defined in lower crate housing member 20 in or near the rear wall 88. Drain hole 64 allows liquid to exit the kennel 10. A removable drain plug 80, seen in FIG. 10, is installed in drain hole 64. Drain plug 80 may be removed to allow liquid to exit kennel 10. An additional drain recess 55 is defined in moat 54 adjacent drain hole 64 in the floor of lower crate housing member 20 in some embodiments. The drain recess 55 allows liquid to more easily escape through drain hole 64. As seen in FIG. 10, in some embodiments a plug recess 82 is formed in the outer wall of lower crate housing member 20 adjacent drain hole and drain plug 80. Plug recess 82 is integrally formed to provide additional structural integrity and also to recess drain plug 80 so that it does not protrude beyond the rear outer profile of kennel housing 12. During use, drain plug 80 may be removed so that the kennel 10 will drain water from a wet animal to the exterior of the kennel 10.

Figure 7:
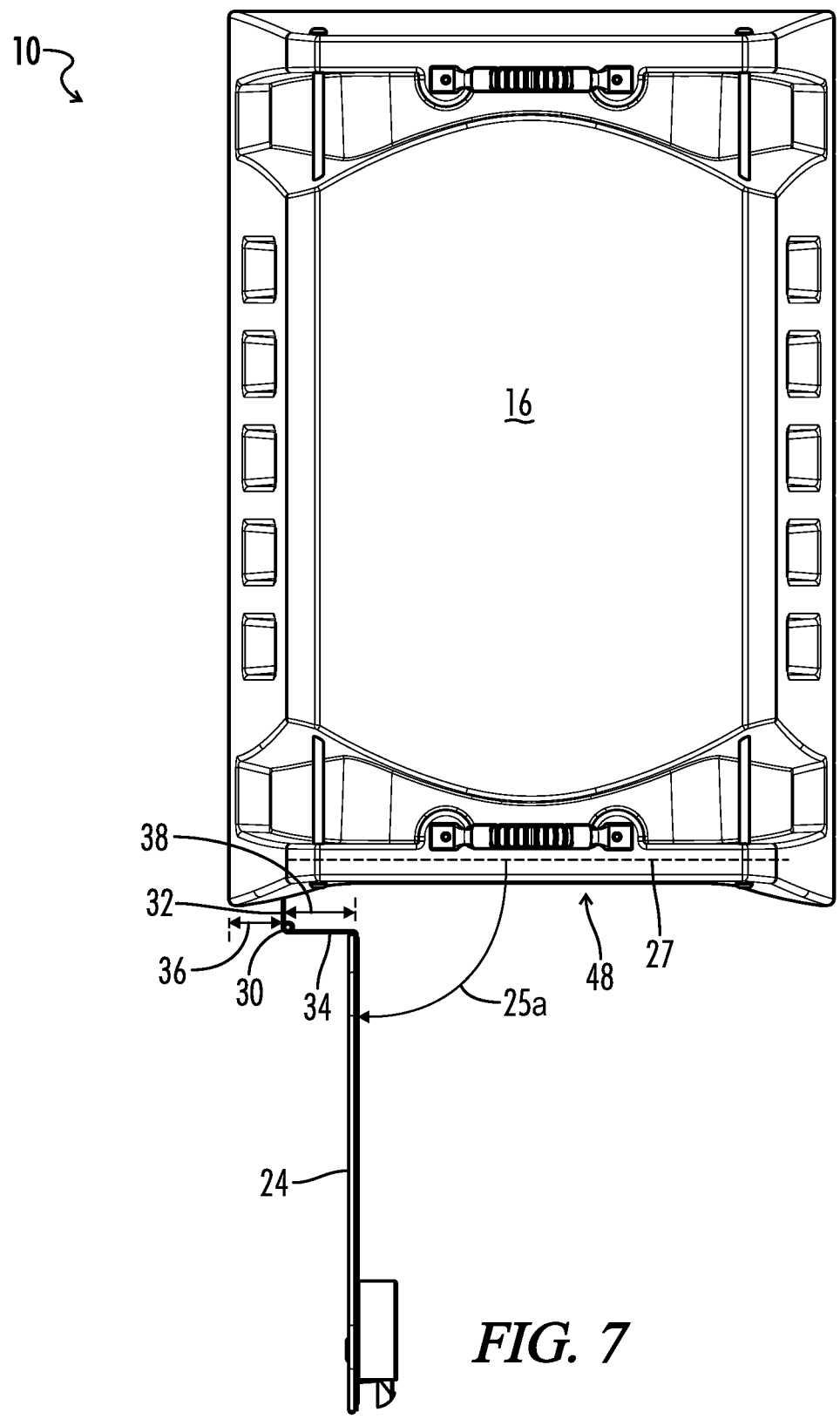
FIG. 7 illustrates a top view of an embodiment of an animal crate with a door open about ninety degrees from a closed position.
Figure 8:
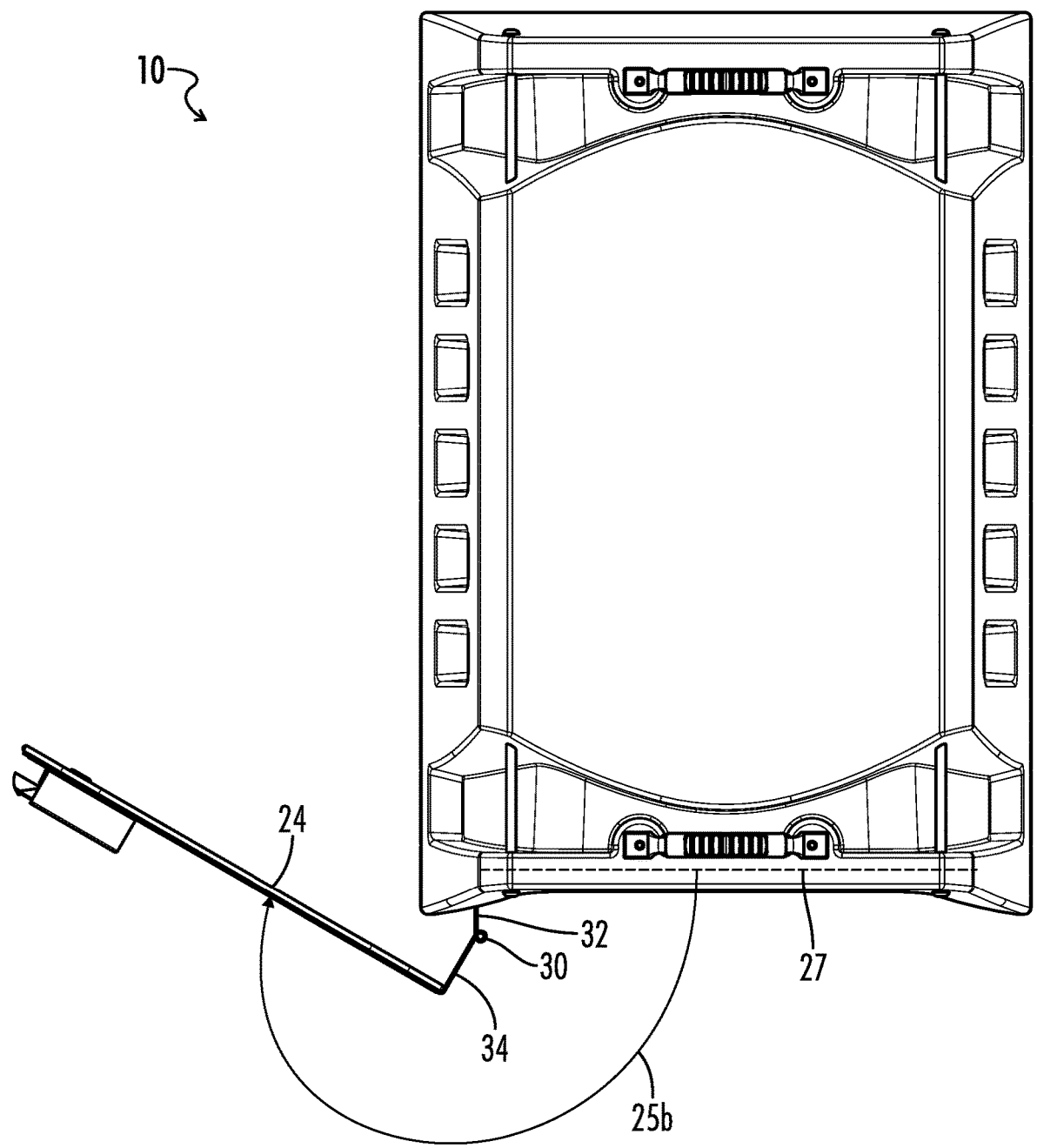
FIG. 8 illustrates a top view of an embodiment of an animal crate with a door open greater than about 180 degrees from a closed position.
Figure 9:
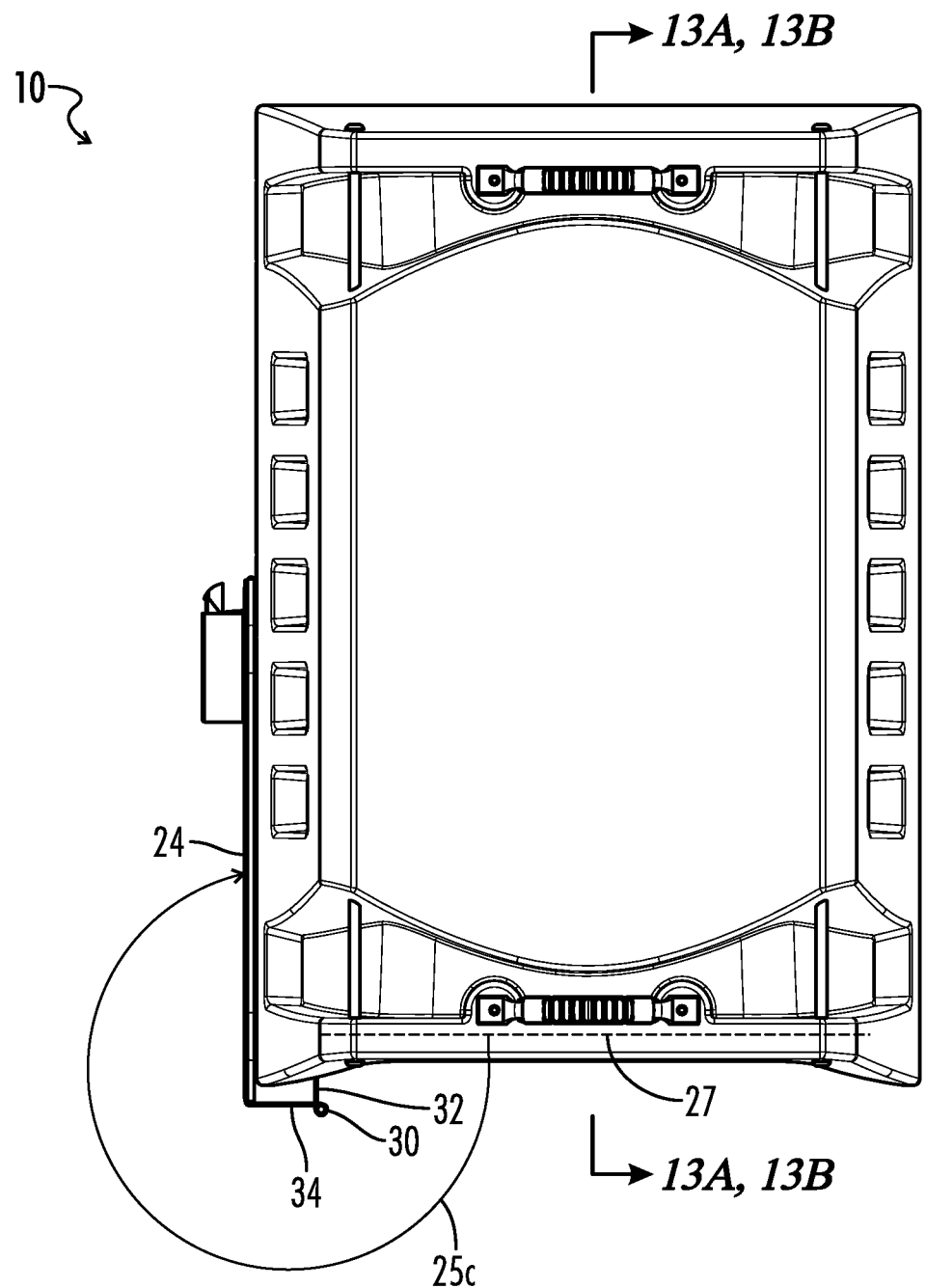
FIG. 9 illustrates a top view of an embodiment of an animal crate with a door open about 270 degrees from a closed position.

Referring further to FIG. 1 and FIGS. 7-9, kennel 10 in some embodiments includes a door 24 that is moveable from a fully closed position to a fully open position. In the closed position, indicated by line 27 in FIG. 7, door 24 covers door opening 48. Door 24 may be opened about door hinge 30 away from the door opening. Door 34 includes an L-shaped door bracket 34 in some embodiments. Door bracket 34 is secured at one end to door 24 and at the other end to door hinge 30. As such, door bracket 34 provides an angled extension protruding from a vertical edge of door 24. In some embodiments, door bracket 34 is substantially ninety degrees. In other embodiments, door bracket 34 includes any other suitable angle. Referring to FIG. 7, door 24 may be opened to a first angle 25a of ninety degrees or greater. Referring to FIG. 8, door 24 may be further opened to a second angle 25b greater than 180 degrees from the fully closed position indicated by line 27.

A kennel bracket 32 protrudes from kennel body 12 in some embodiments, and door hinge 30 is positioned on the distal end of kennel bracket 32. Door hinge 30 is offset from the nearest outer side wall of kennel body 12 by a door hinge offset distance, or first offset distance 36, seen in FIG. 7. First offset distance 36 is generally the normal distance between the door hinge and the local outermost side wall surface. Similarly, door hinge 30 is offset from the plane of door 24 by a door bracket offset distance 38, or second offset distance, seen in FIG. 7. In some embodiments, door bracket offset distance 38 is equal to or greater than door hinge offset distance 36. This allows door 24 to be rotated to a third angle 25c shown in FIG. 9 about 270 degrees away from the closed position to a location alongside the outer wall of kennel body 12. In this configuration, door 24 may be opened and swung around to the side of kennel body 12 in a compact position. This allows kennel 10 to remain open without having door 24 extending outwardly from kennel body 12 and taking up too much space.

Figure 2:
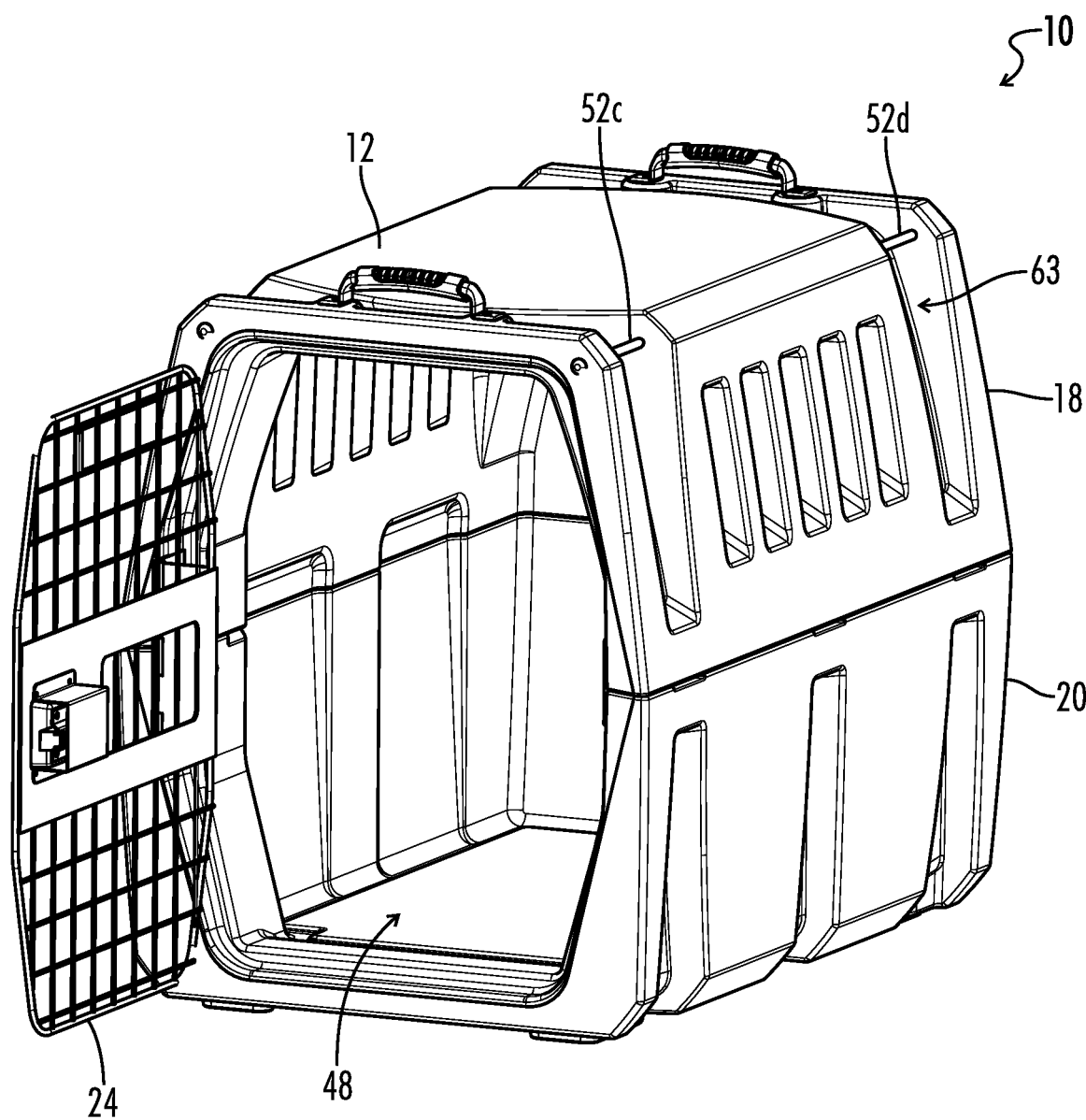
FIG. 2 illustrates a perspective view of an embodiment of an animal crate in accordance with the present disclosure.

Referring further to FIG. 1 and FIG. 2, in some embodiments, kennel 10 includes numerous integrated attachment bars located near the upper corners of kennel body 12. First and second attachment bars 52a, 52b are located along a first edge of kennel body 12, and second and third attachment bars 52c, 52c are located along a second edge of kennel body 12. Each attachment bar is located in a corresponding attachment recess 63 integrally formed in the outer wall of kennel body 12. Each attachment bar 52 is mounted in a socket such that the bar spans its associated attachment recess 63. As such, the attachment bars are flushly mounted along the outer profile of the kennel body and do not undesirably extend outwardly from the kennel body where they could become broken or damaged. Additionally, the corresponding attachment recess 63 surrounding each attachment bar 52 provides clearance space for passage of one or more tie-downs, webbing, strap, rope or chains for securing kennel 10 to a structure such as a truck bed. Each attachment bar 52 also allows kennel 10 to be locked securely to a structure to prevent theft of kennel 10 in some embodiments. In some embodiments, first and second attachment bars 52a, 52b are separate metal bars each installed in its own socket. In other embodiments, first and second attachment bars 52a, 52b form one continuously metal bar inserted through the entire length of kennel body 12.

Figure 5:
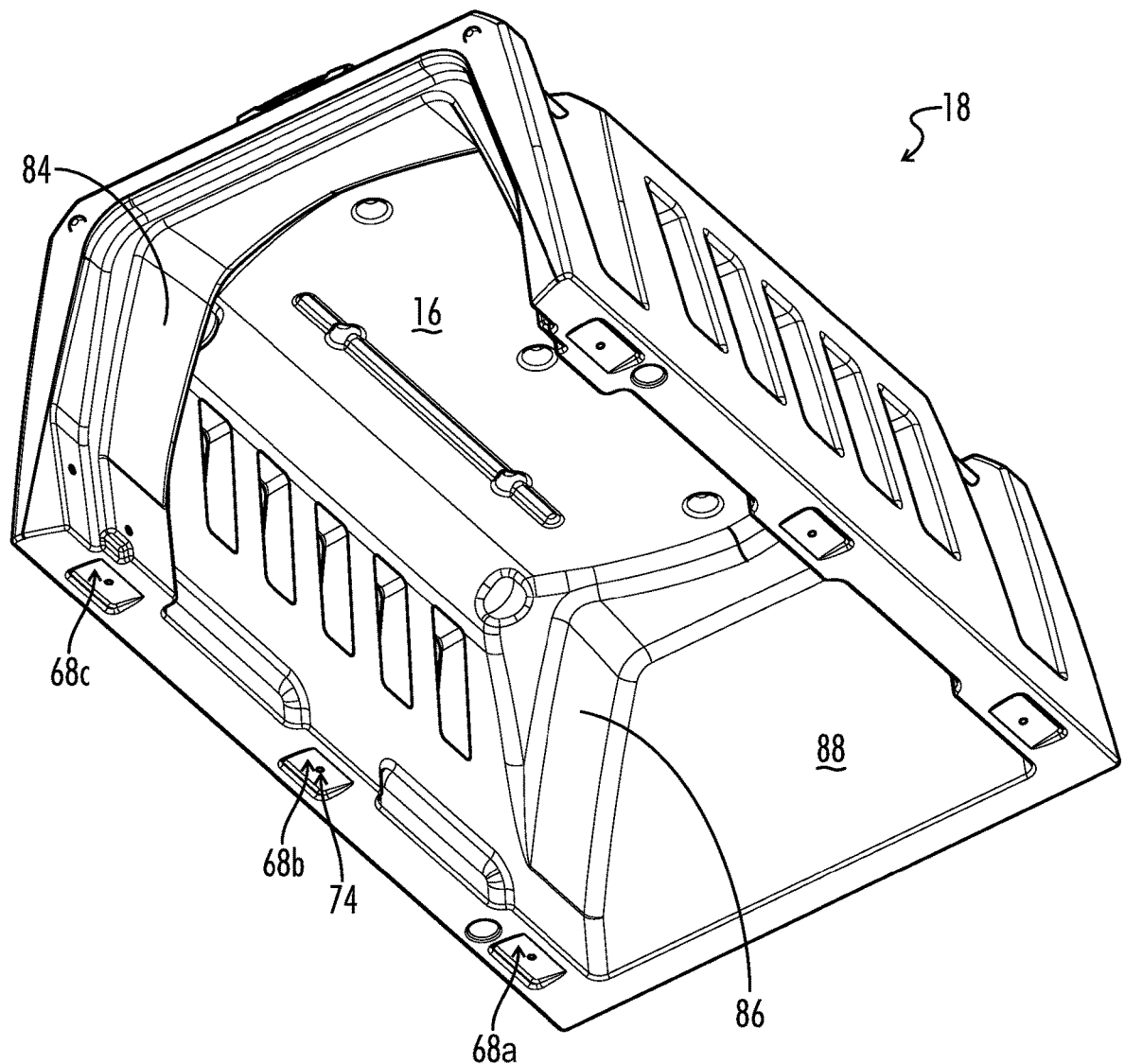
FIG. 5 illustrates a perspective view of an embodiment of an upper housing member for an animal crate in accordance with the present disclosure.

Referring further to FIG. 5, in some embodiments kennel 10 includes integrated truss members 84, 86. A first integrated truss member 84 is formed along the roof and upper side walls of upper crate housing member 18. First integrated truss member 84 includes an integrally molded support region extending farther downwardly into the enclosure than the surrounding inner wall regions, forming an integrated truss. First integrated truss member 84 is located adjacent door opening 48 in some embodiments. Similarly, a second integrated truss member 86 is formed along the inner wall of upper crate housing member 18 in some embodiments near the rear of the kennel. Second integrated truss member 86 may be formed adjacent rear wall 88 in some embodiments. First and second integrated truss members 84, 86 provide additional structural rigidity to upper crate housing member 18 and particularly to roof 16. This provides additional strength when kennel 10 is loaded externally from above or from the sides.

Figure 6:
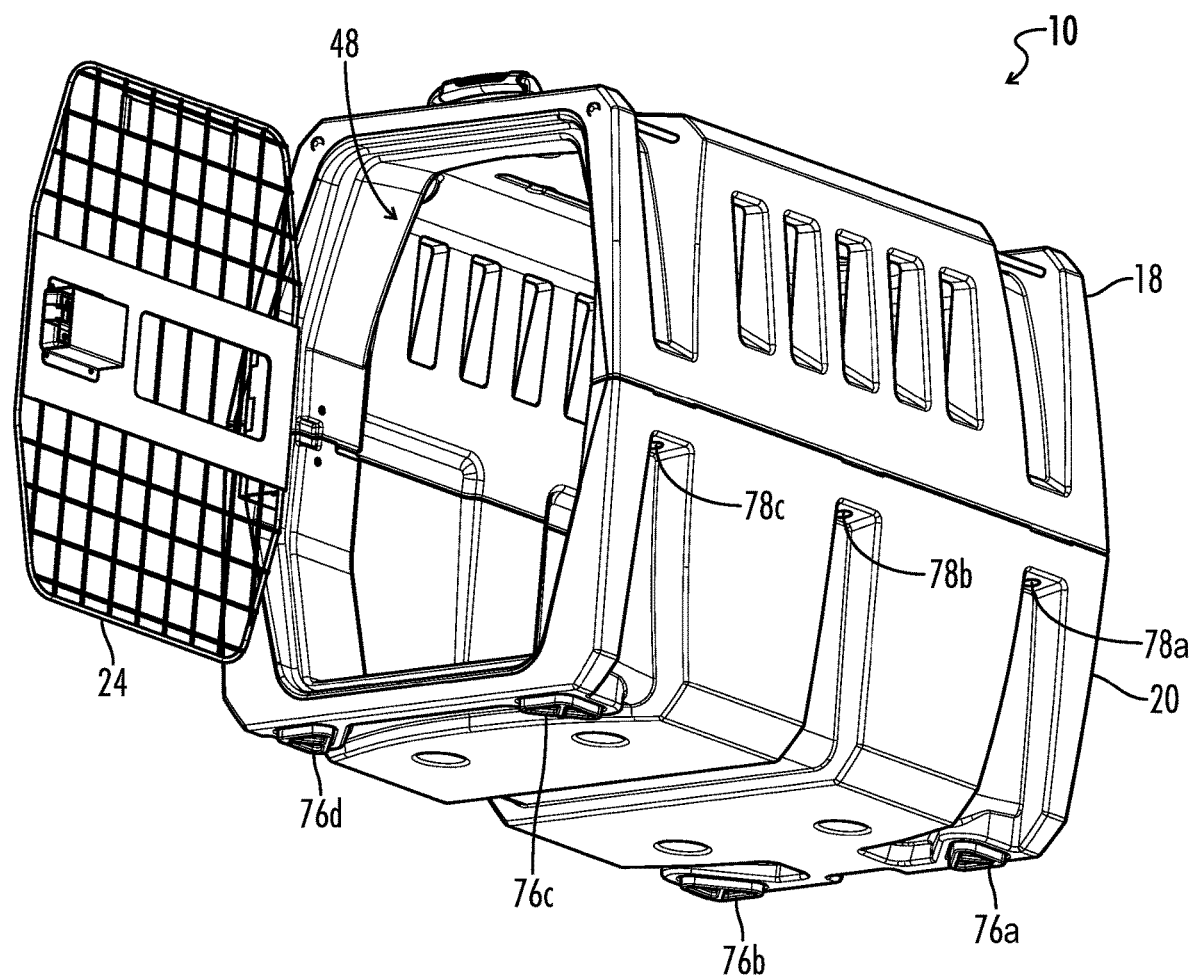
FIG. 6 illustrates a perspective view of an embodiment of an animal crate in accordance with the present disclosure.

Referring now to FIGS. 6 and 11, in some embodiments, kennel 10 includes one or more non-skid feet 76 disposed along the bottom of kennel body 12. Each foot 76 includes a not-skid material such as a rubber, polymer, urethane, etc. Each foot 76 protrudes downwardly from the lower outer wall on lower crate housing member 20. Each foot 76 may be integrally molded into the lower crate housing member 20 during a casting or molding procedure. Alternatively, each foot 76 forms a separate component that is installed on lower crate housing member 20 after molding. Each foot 76 prevents kennel 10 from inadvertently sliding on a surface during use or during transport. Additionally, feet 76 may reduce or dampen vibrations felt by the animal housed within kennel 10.

Figure 16:
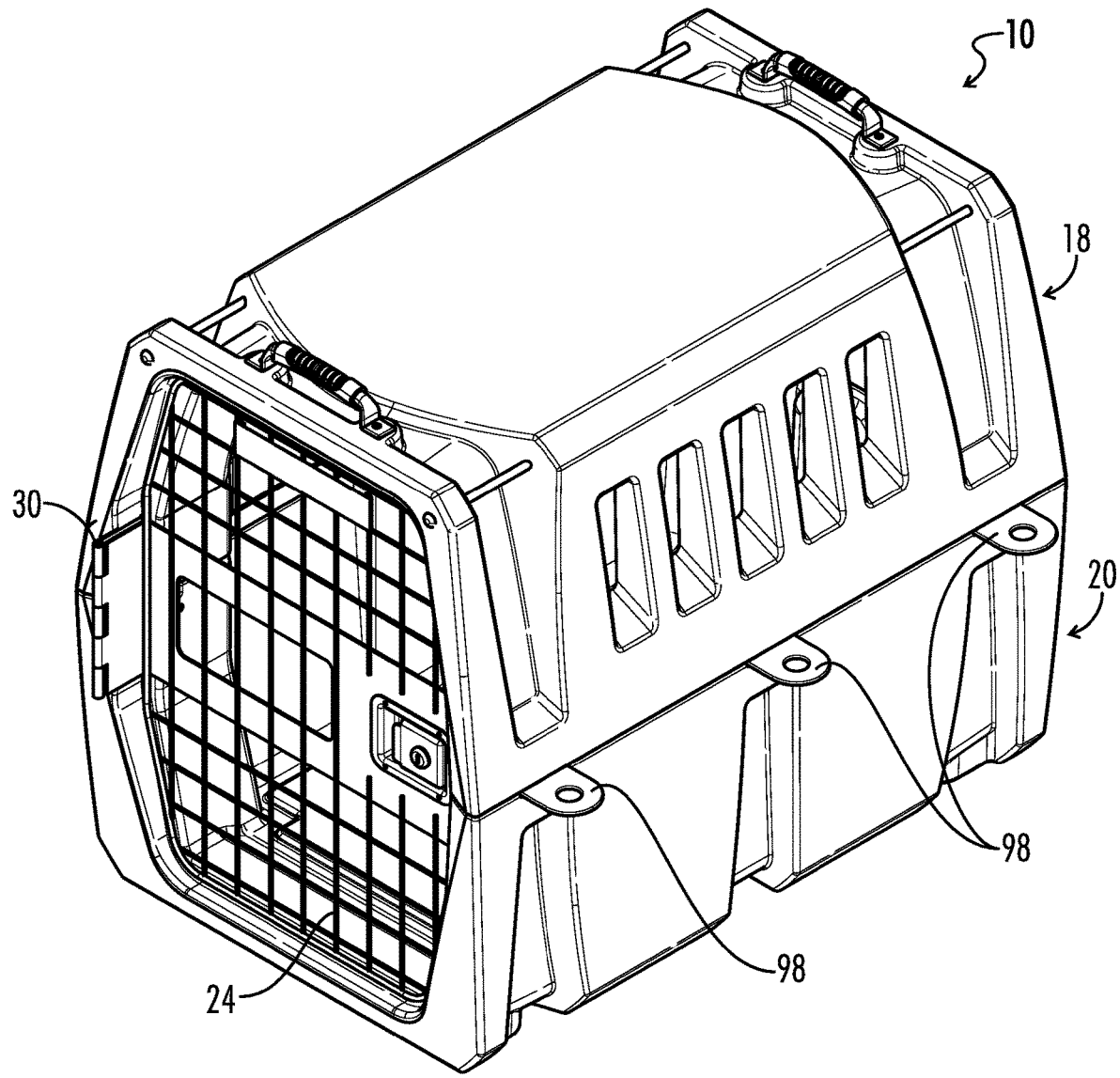
FIG. 16 illustrates a perspective view of an embodiment of an animal crate in accordance with the present disclosure.

Referring to FIG. 16, one or more lock flanges 98 extend from kennel body 10 in some embodiments. Each lock flange 98 includes a flange including a hole or recess for attaching a lock, cable, tie-down or other securement device. Each lock flange 98 includes a structure that may be sandwiched or clamped between upper and lower housing members. Each lock flange may be removed when not in use by disassembling upper and lower housing members.

Thus, although there have been described particular embodiments of the present invention of a new and useful Animal Enclosure it is not intended that such references be construed as limitations upon the scope of this invention except as set forth in the following Claims.

What is claimed is:

1. A kennel apparatus configured to accommodate an animal, the apparatus comprising:
   a roto-molded kennel body defining an interior space, the interior space shaped to accommodate the animal, the kennel body including a door opening positioned to allow the animal to enter and exit the kennel body;
   a hinged door attached to the kennel body, wherein the door is pivotable about a hinge between a closed position wherein the door blocks the door opening and an open position wherein the door does not block the door opening;
   a latch on the door configured to selectively secure the door in the closed position;
   the kennel body including an inner wall on the kennel body and an outer wall on the kennel body, wherein the inner and outer walls are separated by a gap, wherein the gap between the inner and outer walls includes air;
   a first window defined in the kennel body;
   an integrated support standoff positioned in the gap between the inner wall and the outer wall;
   a second window defined in the kennel body;
   a vent support disposed between the first and second windows, the vent support including an outer support wall, an inner support wall, a first side support wall facing the first window, and a second side support wall opposite first side support wall facing the second window;
   an inclined vent ramp defined at the first window, the inclined vent ramp including a sloped surface in the kennel body sloping downwardly from the inner wall to the outer wall of the kennel body;
   the kennel body including a first edge of the kennel body and a second edge of the kennel body;
   the kennel body defining a first attachment recess along the first edge of the kennel body and defining a second attachment recess along the second edge of the kennel body;
   a first attachment bar disposed on the first edge of the kennel body, the first attachment bar spanning the first attachment recess;
   a second attachment bar disposed on the second edge of the kennel body, the second attachment bar spanning the second attachment recess;
   a first integrated truss member disposed in the kennel body;
   a second integrated truss member disposed in the kennel body at a location different from the first integrated truss member;
   the kennel body including a bottom;
   a first non-skid foot disposed on the bottom of the kennel body;
   a second non-skid foot disposed on the bottom of the kennel body;
   a third non-skid foot disposed on the bottom of the kennel body;
   a fourth non-skid foot disposed on the bottom of the kennel body;
   the kennel body including a roof, including a first handle disposed on the roof of the kennel body and a second handle disposed on the roof of the kennel body, wherein the first and second handles are secured to the kennel body using one or more fasteners on each handle;
   a drain hole defined in the kennel body between the inner wall and the outer wall;
   a drain plug installed in the drain hole, wherein the drain plug is selectively removable;
   a floor defined in the inner wall of the kennel body; and
   a recessed moat defined in the floor.

* * * * *